(12) United States Patent
Finck et al.

(10) Patent No.: US 12,555,015 B2
(45) Date of Patent: *Feb. 17, 2026

(54) MULTIMODE COUPLER TO CONTROL INTERACTION BETWEEN QUANTUM BITS

(71) Applicant: International Business Machines Corporation, Armonk, NY (US)

(72) Inventors: Aaron Finck, White Plains, NY (US); David C. Mckay, Ossining, NY (US); Jiri Stehlik, New York, NY (US); John Blair, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 925 days.

This patent is subject to a terminal disclaimer.

(21) Appl. No.: 17/835,511

(22) Filed: Jun. 8, 2022

(65) Prior Publication Data

US 2023/0401475 A1 Dec. 14, 2023

(51) Int. Cl.
*G06N 10/40* (2022.01)
*G06N 10/20* (2022.01)
*H10N 60/10* (2023.01)

(52) U.S. Cl.
CPC ............. *G06N 10/40* (2022.01); *G06N 10/20* (2022.01); *H10N 60/11* (2023.02); *H10N 60/128* (2023.02)

(58) Field of Classification Search
CPC ...................................................... G06N 10/40
(Continued)

(56) References Cited

U.S. PATENT DOCUMENTS

| 5,625,290 A * | 4/1997 | You | G01R 33/0358 |
| | | | 257/E39.015 |
| 9,685,935 B2 * | 6/2017 | Strand | B82Y 10/00 |

(Continued)

FOREIGN PATENT DOCUMENTS

| EP | 4505364 A1 | 2/2025 |
| WO | 2023/237455 A1 | 12/2023 |

OTHER PUBLICATIONS

C. K. Andersen et al., "Entanglement Stabilization Using Ancilla-Based Parity Detection and Real-Time Feedback in Superconducting Circuits," NPJ Quantum Information, Aug. 15, 2019, pp. 1-7, vol. 5, No. 1.

(Continued)

*Primary Examiner* — Reza Nabi
(74) *Attorney, Agent, or Firm* — Erik Johnson; Ryan, Mason & Lewis, LLP

(57) ABSTRACT

A device comprises first and second superconducting quantum bits, and a multimode coupler circuit coupled between the first and second superconducting quantum bits. The multimode coupler circuit comprises a first mode and a second mode, and is configured to operate in one of a first state and a second state, in response to a flux tuning control signal. In the first state, the first superconducting quantum bit is exchange coupled to the first mode, and the second superconducting quantum bit is exchange coupled to the second mode, to suppress interaction between the first and second superconducting quantum bits. In the second state, the first and second superconducting quantum bits are exchange coupled to both the first and second modes, to enable an interaction between the first and second superconducting quantum bits and perform an entanglement gate operation.

20 Claims, 9 Drawing Sheets

(58) Field of Classification Search
USPC .......................................................... 706/62
See application file for complete search history.

(56) References Cited

U.S. PATENT DOCUMENTS

| | | | | |
|---|---|---|---|---|
| 10,374,612 | B1* | 8/2019 | Sinclair | G06N 10/40 |
| 10,467,544 | B2* | 11/2019 | Filipp | G06N 10/40 |
| 10,572,816 | B1* | 2/2020 | Vavilov | G06N 10/70 |
| 10,573,685 | B1* | 2/2020 | Adiga | H10N 60/805 |
| 10,924,095 | B1* | 2/2021 | Mckay | G06N 10/20 |
| 10,957,737 | B2 | 3/2021 | Adiga et al. | |
| 11,658,660 | B1* | 5/2023 | Finck | H10N 60/12 327/527 |
| 12,340,273 | B2* | 6/2025 | Siddiqi | G06N 10/40 |
| 2010/0148853 | A1 | 6/2010 | Harris | B82Y 10/00 326/4 |
| 2011/0227487 | A1* | 9/2011 | Nichol | G02B 6/0018 362/613 |
| 2011/0255303 | A1* | 10/2011 | Nichol | G02B 6/0088 362/606 |
| 2011/0273906 | A1* | 11/2011 | Nichol | G02B 6/0028 445/24 |
| 2011/0277361 | A1* | 11/2011 | Nichol | G02B 6/0028 40/541 |
| 2013/0155723 | A1* | 6/2013 | Coleman | G02B 6/0028 362/621 |
| 2014/0049983 | A1* | 2/2014 | Nichol | G02B 6/0028 362/610 |
| 2017/0193388 | A1* | 7/2017 | Filipp | G06N 10/40 |
| 2019/0363128 | A1* | 11/2019 | Rosenblatt | B82Y 10/00 |
| 2021/0182728 | A1* | 6/2021 | Neill | H03K 19/195 |
| 2021/0384404 | A1* | 12/2021 | Finck | H10N 69/00 |
| 2021/0406746 | A1* | 12/2021 | Stehlik | H10D 48/383 |
| 2021/0408112 | A1* | 12/2021 | Finck | G06N 10/40 |
| 2021/0408113 | A1* | 12/2021 | Finck | H01P 3/003 |
| 2022/0138611 | A1* | 5/2022 | Siddiqi | G06N 10/40 716/100 |
| 2023/0401475 | A1* | 12/2023 | Finck | H10N 60/128 |
| 2024/0078460 | A1* | 3/2024 | Finck | G06N 10/70 |
| 2025/0029781 | A1* | 1/2025 | Finck | G06N 10/40 |
| 2025/0131306 | A1* | 4/2025 | Finck | H10N 60/12 |
| 2025/0131307 | A1* | 4/2025 | Finck | G06N 10/20 |

OTHER PUBLICATIONS

B. Criger et al., "Quantum Error Correction with Mixed Ancilla Qubits," Physical Review A, arXiv:1201.1517v2, Mar. 8, 2012, 5 pages.
A. Kandala et al., "Demonstration of a High-Fidelity CNOT Gate for Fixed-Frequency Transmons with Engineered ZZ Suppression," Physical Review Letters, arXiv:2011.07050v1, Nov. 13, 2020, 10 pages.
P. Zhao et al., "Quantum Crosstalk Analysis for Simultaneous Gate Operations on Superconducting Qubits," PRX Quantum, Apr. 1, 2022, 21 pages, vol. 3, No. 020301.

L. Ding et al., "Microwave Activated Two-Qubit Gate for Fluxonium Qubits via a Tunable-Transmon Coupler," Bulletin of the American Physical Society, Abstract only, Mar. 14-18, 2022, 2 pages.
I. N. Moskalenko et al., "Tunable Coupling Scheme for Implementing Two-Qubit Gates on Fluxonium Qubits," Applied Physics Letters, arXiv:2107.11550v2, Sep. 26, 2021, 14 pages.
K. N. Nesterov et al., "Proposal for Entangling Gates on Fluxonium Qubits via a Two-Photon Transition," PRX Quantum vol. 2, No. 020345, Jun. 22, 2021, 15 pages.
A. D. K. Finck et al., "Suppressed Crosstalk Between Two-Junction Superconducting Qubits with Mode-Selective Exchange Coupling," Physical Review Applied, arXiv:2105.11495v2, Nov. 22, 2021, 7 pages.
H. Paik et al., "Experimental Demonstration of a Resonator-Induced Phase Gate in a Multi-Qubit Circuit QED System," Physical Review Letters, arXiv:1606.00685v1, Jun. 2, 2016, 13 pages.
Q. Ficheux et al., "Fast Logic with Slow Qubits: Microwave-Activated Controlled-Z gate on Low-Frequency Fluxoniums," Physical Review X, arXiv:2011.02634v1, Nov. 5, 2020, 17 pages.
H. S. Ku et al., "Qubit Gates Using Hyperbolic Secant Pulses," Physical Review A, arXiv:1704.00803v2, Apr. 5, 2017, 5 pages.
C. Chamberland et al., "Topological and Subsystem Codes on Low-degree Graphs with Flag Qubits," Physical Review X, vol. 10, No. 011022, Jan. 31, 2020, 19 pages.
J. M. Kreikebaum et al., "Improving Wafer-scale Josephson Junction Resistance Variation in Superconducting Quantum Coherent Circuits," Superconductor Science and Technology, vol. 33, No. 6, Apr. 29, 2020, 6 pages.
J. Stehlik et al., "Tunable Coupling Architecture for Fixed-Frequency Transmons," arXiv:2101.07746v1, Jan. 19, 2021, 7 pages.
P. Mundada et al., "Suppression of Qubit Crosstalk in a Tunable Coupling Superconducting Circuit," Physical Review Applied, arXiv:1810.04182v2, May 31, 2019, 11 pages.
B. Foxen et al., "Demonstrating a Continuous Set of Two-Qubit Gates for Near-Term Quantum Algorithms," Physical Review Letters, vol. 125, Sep. 15, 2020, 6 pages.
J. Stehlik et al., "Tunable Coupling Architecture for Fixed-frequency Transmon Superconducting Qubits," Physical Review Letters, vol. 127, Aug. 20, 2021, 6 pages.
F. Yan et al., "A Tunable Coupling Scheme for Implementing High-fidelity Two-Qubit Gates," Physical Review Applied, arXiv:1803.09813v1, Mar. 26, 2018, 10 pages.
M. Steffen et al., "Shaped Pulses for Quantum Computing," Physical Review A, vol. 75, No. 062326, Jun. 21, 2007, 4 pages.
P. Mell et al., "The NIST Definition of Cloud Computing," Recommendations of the National Institute of Standards and Technology, Special Publication 800-145, Sep. 2011, 7 pages.
International Search Report and Written Opinion of PCT/EP2023/064894, Sep. 1, 2023, 15 pages.
Response to the communication pursuant to Rules 161(1) and 162 EPC, European Application No. 23732402.5 dated Apr. 17, 2025, 5 pages.

* cited by examiner

100

200

400

500

600

700

MULTIMODE COUPLER TO CONTROL INTERACTION BETWEEN QUANTUM BITS

BACKGROUND

This disclosure relates generally to superconducting quantum computing and, in particular, superconducting quantum systems and devices that are implemented using superconducting quantum bits (qubits). A superconducting quantum computing system is implemented using circuit quantum electrodynamics (QED) devices, which utilize the quantum dynamics of electromagnetic fields in superconducting circuits, which include superconducting qubits, to generate and process quantum information. In general, superconducting qubits are electronic circuits which are implemented using components such as superconducting tunnel junctions (e.g., Josephson junctions), inductors, and/or capacitors, etc., and which behave as quantum mechanical anharmonic (non-linear) oscillators with quantized states, when cooled to cryogenic temperatures. A qubit can be effectively operated as a two-level system using a ground state and first excited state of the qubit due to the anharmonicity imparted by a non-linear inductor element (e.g., Josephson inductance) of the qubit, which allows the ground and first-excited states to be uniquely addressed at a transition frequency of the qubit, without significantly disturbing the higher-excited states of the qubit.

Various types of quantum information processing operations can be implemented using a superconducting quantum processor which comprises multiple superconducting qubits, wherein the superconducting qubits can be coherently controlled, placed into quantum superposition states (via, e.g., single-gate operations), exhibit quantum interference effects, and become entangled with one another (via, e.g., entanglement gate operations). The fidelity of quantum gate operations can be adversely impacted by unwanted crosstalk (e.g., residual static ZZ interactions) between adjacent superconducting qubits. For example, unwanted crosstalk between superconducting qubits can cause the transition frequency of one superconducting qubit to be dependent on the state of one or more neighboring superconducting qubits. As quantum processors are scaled with increasing numbers of superconducting qubits and higher integration densities, such unwanted crosstalk becomes increasingly problematic.

SUMMARY

Exemplary embodiments of the disclosure include quantum devices that are configured to control interaction (e.g., ZZ interactions) between coupled superconducting quantum bits.

An exemplary embodiment includes a device which comprises a first superconducting quantum bit, a second superconducting quantum bit, and a multimode coupler circuit. The multimode coupler circuit is coupled between the first superconducting quantum bit and the second superconducting quantum bit. The multimode coupler circuit comprises a first mode and a second mode. The multimode coupler circuit is configured to operate in one of a first state and a second state, in response to a flux tuning control signal applied to the multimode coupler circuit. In the first state of the multimode coupler circuit, the first superconducting quantum bit is exchange coupled to the first mode, and the second superconducting quantum bit is exchange coupled to the second mode, to suppress interaction between the first superconducting quantum bit and the second superconducting quantum bit. In the second state of the multimode coupler circuit, the first superconducting quantum bit and the second superconducting quantum bit are exchange coupled to both the first mode and the second mode, to enable an interaction between the first superconducting quantum bit and the second superconducting quantum bit and perform an entanglement gate operation.

Advantageously, the coupling of the first and second superconducting quantum bits using a multimode coupler circuit, which comprise two distinct modes of excitation, allows for the simultaneous suppression of both static ZZ interactions and exchange interactions between the first and second superconducting quantum bits in instances where the multimode coupler circuit is flux tuned to enforce a mode-selective exchange coupling in which the first superconducting quantum bit is exchange coupled to only the first mode, and the second superconducting quantum bit is exchange coupled to only the second mode. When the first and second superconducting quantum bits are exchanged coupled to the distinct modes, such mode-selective exchange coupling results in substantially zero interaction between the first and second superconducting quantum bits.

On the other hand, to implement an entanglement gate operation between the first and second superconducting quantum bits, the multimode coupler circuit is flux tuned to alter the mode-selective exchange coupling such that both of the first and second superconducting quantum bits will have exchange coupling to both the first and second modes of the multimode coupler circuit, which results in relatively strong ZZ interaction between the first and second superconducting quantum bits to achieve fast, high-fidelity entanglement gate operations between the first and second superconducting quantum bits.

In some embodiments, the multimode coupler circuit comprises a first superconducting tunnel junction device, and a second superconducting tunnel junction device, which are coupled to form a superconducting loop (e.g., a superconducting quantum interference device). The multimode coupler circuit is tuned to operate in one of the first state and the second state, in response to the flux tuning control signal applied to the superconducting loop. Advantageously, the flux tuning of the multimode coupler circuit can be achieved with relatively low bandwidth signals (e.g., less than 100 MHz).

Another exemplary embodiment includes a system which comprises a quantum processor, and a control system. The quantum processor comprises an array of superconducting quantum bits. The control system is configured to generate control signals to control the quantum processor. The array of superconducting quantum bits comprises a first superconducting quantum bit, a second superconducting quantum bit, and a multimode coupler circuit. The multimode coupler circuit is coupled between the first superconducting quantum bit and the second superconducting quantum bit. The multimode coupler circuit comprises a first mode and a second mode. The multimode coupler circuit is configured to operate in one of a first state and a second state, in response to a flux tuning control signal applied to the multimode coupler circuit. In the first state of the multimode coupler circuit, the first superconducting quantum bit is exchange coupled to the first mode, and the second superconducting quantum bit is exchange coupled to the second mode, to suppress interaction between the first superconducting quantum bit and the second superconducting quantum bit. In the second state of the multimode coupler circuit, the first superconducting quantum bit and the second superconducting quantum bit are exchange coupled to both the first mode and the second mode, to enable an interaction between the first superconducting quantum bit and the second superconducting quantum bit and perform an entanglement gate operation.

Another exemplary embodiment includes a device which comprises a first superconducting transmon quantum bit, a second superconducting transmon quantum bit, and a superconducting multimode coupler circuit coupled between the first superconducting transmon quantum bit and the second superconducting transmon quantum bit. The superconducting multimode coupler circuit comprises a first superconducting pad, a second superconducting pad, and a third superconducting pad, disposed between the first superconducting pad and the second superconducting pad. The superconducting multimode coupler circuit further comprises a superconducting quantum interference device, which comprises a first superconducting tunnel junction device, and a second superconducting tunnel junction device, which are coupled to and between the first superconducting pad and the third superconducting pad and forming a superconducting loop. A third superconducting tunnel junction device is coupled to and between the second superconducting pad and the third superconducting pad. The first superconducting transmon quantum bit is coupled to the first superconducting pad and to the second superconducting pad of the superconducting multimode coupler circuit. The second superconducting transmon quantum bit is coupled to the third superconducting pad of the superconducting multimode coupler circuit.

Other embodiments will be described in the following detailed description of exemplary embodiments, which is to be read in conjunction with the accompanying figures.

DETAILED DESCRIPTION

Figure 1:
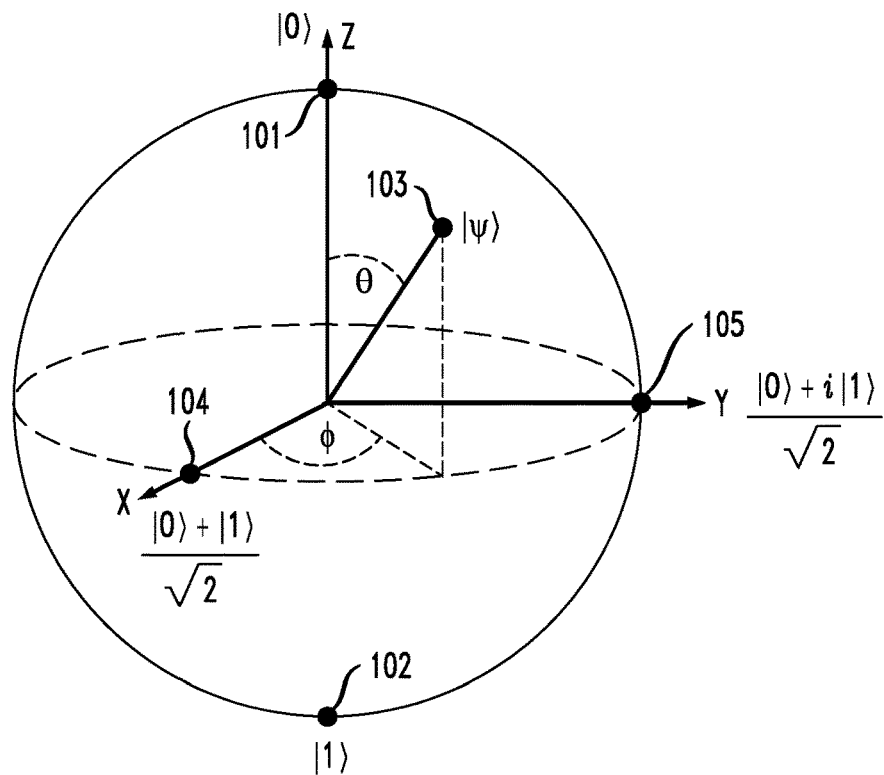
FIG. 1 depicts a Bloch sphere which graphically represents various states of a quantum bit.

Exemplary embodiments of the disclosure will now be described in further detail with regard to quantum devices that are configured to control interaction (e.g., ZZ interactions) between coupled superconducting qubits. It is to be understood that the various features shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration." Any embodiment or design described herein as "exemplary" is not to be construed as preferred or advantageous over other embodiments or designs.

Further, it is to be understood that the phrase "configured to" as used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, wherein the hardware may comprise quantum circuit elements (e.g., quantum bits, coupler circuitry, etc.), discrete circuit elements (e.g., transistors, inverters, etc.), programmable elements (e.g., application specific integrated circuit (ASIC) chips, field-programmable gate array (FPGA) chips, etc.), processing devices (e.g., central processing units (CPUs), graphics processing units (GPUs), etc.), one or more integrated circuits, and/or combinations thereof. Thus, by way of example only, when a circuit, structure, element, component, etc., is defined to be configured to provide a specific functionality, it is intended to cover, but not be limited to, embodiments where the circuit, structure, element, component, etc., is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit, structure, element, component, etc., is in a non-operational state (e.g., not connected nor otherwise deployed in a system, not powered on, not receiving an input, and/or not producing an output) or in a partial operational state.

As is known in the art, quantum computing provides a computing paradigm which utilizes fundamental principles of quantum mechanics to perform computations. Quantum computing algorithms and applications are defined using quantum circuits. A quantum circuit is a computational routine which defines coherent quantum operations that are performed on quantum data that is stored in quantum bits, in conjunction with operations that are performed using classical computation. Quantum circuits are utilized to define complex algorithms and applications in an abstract manner, which can be executed on a quantum computer. In a quantum computer, primitive operations comprise gate operations (e.g., single-qubit gate operations, two-qubit gate operations, multi-qubit gate operations (e.g., 3 or more qubits) that are applied to qubits, to perform quantum computing operations for a given application. The quantum circuits allow a quantum computer to receive classical data, perform quantum operations based on the received data, and output a classical solution.

A single qubit can have a basis state of $|0\rangle$ or $|1\rangle$, or a linear combination of such basis states, which is known as a superposition state. As is known in the art, the state of a qubit can be graphically represented as a point on unit sphere (radius=1), which is called the Bloch sphere, such as illustrated in FIG. 1. In particular, FIG. 1 illustrates an exemplary Bloch sphere 100 in which the basis states $|0\rangle$ or $|1\rangle$ of a qubit are represented along the Z-axis of the Bloch sphere 100, wherein a point 101 on the positive Z-axis represents the ground state $|0\rangle$, and a point 102 on the negative Z-axis represents a first excited state $|1\rangle$ of the qubit. A superposition state $|\psi\rangle$ of the qubit can be represented as a point on the Bloch sphere as follows:

$$|\psi\rangle = \cos\frac{\theta}{2}|0\rangle + e^{i\phi}\sin\frac{\theta}{2}|1\rangle,$$

where the terms $$\cos\frac{\theta}{2} \text{ and } \sin\frac{\theta}{2}$$

correspond to amplitude probabilities associated with the respective states $|0\rangle$ and $|1\rangle$, and wherein the term $e^{i\phi}$ corresponds to a relative phase between the states $|0\rangle$ and $|1\rangle$. The position of a point 103 (representing a superposition state of a qubit) is determined based on the angles $\theta$ and $\phi$. The angle $\theta$ influences the probability of observing a qubit state of $|0\rangle$ or $|1\rangle$ when the qubit is read, wherein the probability of reading a qubit state of $|1\rangle$ increases as $\theta$ increases. The angle $\phi$ influences the relative phase between the states $|0\rangle$ and $|1\rangle$. For example, when $\theta=0$, the qubit is in the ground state $|0\rangle$, which provides a 100% probability of observing a qubit state of $|0\rangle$ when the qubit state is read. In addition, when $\theta=\pi$, the qubit is in the first excited state $|1\rangle$, which provides a 100% probability of observing a qubit state of $|1\rangle$ when the qubit state is read. On the other hand, when $$\theta = \frac{\pi}{2} \text{ and } \phi = 0,$$

the qubit is in the state at point 104, and when $$\theta = \frac{\pi}{2} \text{ and } \phi = \frac{\pi}{2},$$

the qubit is in the state at point 105. When the qubit is in a superstition state represented by, e.g., points 104 and 105, there is a 50% probability of observing a qubit state of $|1\rangle$, and a 50% probability of observing a qubit state of $|0\rangle$, when the qubit state is read.

The state of a qubit can be changed by applying a single-qubit gate operation to the qubit, which causes the current state of the qubit to rotate around, e.g., the X-axis, Y-axis, and/or Z-axis, etc., depending on the given gate operation. A rotation about the Z-axis results in a change in the angle $\phi$. In addition, qubits can be controlled using entanglement gate operations to entangle the states of two or more qubits and, thereby, generate a combined state of two or more qubits which contains more information than the individual states of the qubits.

As noted above, a superconducting quantum computing system can be implemented using superconducting qubits. For example, a superconducting transmon (transmission line shunted plasma oscillation) qubit is a type of superconducting qubit comprising a superconducting tunnel junction device (e.g., Josephson junction) which is shunted by a capacitor. The Josephson junction functions as a non-linear inductor which, when shunted with a capacitor, forms an anharmonic oscillator with individually addressable energy levels. The transmon qubit is widely used in superconducting quantum computing, as transmon qubits provide good coherence times, and have relatively simple structures that facilitate coupling with other superconducting circuit elements, and qubit readout, etc. To control and readout the qubit, one can design the structures to capacitively or inductively couple the transmon qubits to other circuit elements, including microwave and flux drive lines, readout resonators, and couplers.

In addition, transmon qubits can be designed to have a relatively high anharmonic spectrum, in which the frequency separation between the computational states and the non-computational states, is relatively high, allowing efficient use of a superconducting transmon qubit as a two-level quantum system. In particular, as is known in the art, the operating frequency of a superconducting qubit is the frequency that corresponds to a difference in the energy between the ground state $|0\rangle$ and the first excited state $|1\rangle$ of the qubit. With superconducting qubits, while higher energy levels are available for a given qubit, the quantum system is designed to isolate the two lowest energy levels and utilize each superconducting qubit as a basic two-level system, ignoring higher energy states. The term "anharmonicity" as used herein refers to a difference between (i) the frequency ($f_{01}$) to transition from the ground state $|0\rangle$ to the first excited state $|1\rangle$ and (ii) the frequency ($f_{12}$) to transition from first excited state $|1\rangle$ to the second excited state $|2\rangle$, of the qubit.

Despite the advantages associated with superconducting transmon qubits, it remains an open question on how implement a quantum computing architecture with low cross-talk between transmon qubits to enable independent control (e.g., single-qubit gate operations), and how to implement high-fidelity entanglement gates (e.g., two-qubit gates) between transmon qubits while controlling cross-talk and unwanted ZZ interactions between transmon qubits. As noted above, an entanglement gate is an operation in which external fields (e.g., microwave signals) are applied to a quantum processor to create an entangled state between two or more separate qubits. For example, a controlled-phase gate (CPHASE gate) between two qubits is a type of entangling gate in which one qubit (e.g., target qubit) acquires a phase-shift if and only if both qubits are in their first excited state.

Furthermore, a ZZ interaction is a type of interaction between two qubits or modes, in which the excitation of one qubit or mode causes a shift in the transition frequency of the other qubit or mode. Such ZZ interaction provides a way to entangle two different qubits and create, e.g., a CPHASE gate, because a state-dependent shift in qubit frequency can be made equivalent to a state-dependent phase-shift. ZZ interactions are sometimes referred to as longitudinal coupling or denoted as chi or 2-chi coupling.

Moreover, static ZZ interaction is a type of ZZ interaction that is present between two qubits or modes in the absence of any external RF drives. This "always-on" interaction can be detrimental to quantum system of qubits by inhibiting independent control of each qubit and by creating unwanted entanglement. In particular, static ZZ coupling can occur between neighboring qubits, wherein the state of one qubit affects the qubit frequency of an adjacent qubit, wherein the static ZZ coupling can lead to gate errors. In this regard, static ZZ interaction is a type of unwanted crosstalk between neighboring qubits, which can adversely impact the fidelity of single-qubit gate operations, which are calibrated under the assumption that the qubit frequency is fixed.

Another source of crosstalk between neighboring qubits includes exchange interactions that occur when a microwave pulse is applied to one qubit (such as for a single-qubit gate operation), which can potentially affect another qubit if there is an exchange interaction present between such neighboring qubits. For example, if exchange interaction exits between two qubits, applying microwave pulses to one qubit can conceivably excite the other qubit, which is a form of crosstalk that could be detrimental. Exemplary embodiments of the disclosure will now be discussed with regard to techniques for implementing a scalable quantum computing architecture with transmon qubits that are coupled using a tunable multimode coupler circuit to implement high-fidelity entanglement gate operations, while suppressing unwanted crosstalk between the coupled transmon qubits, e.g., suppressing static ZZ interactions between the coupled transmon qubits, and suppressing exchange interactions between the coupled transmon qubits when performing a single-gate operation on one of the coupled transmon qubits.

Figure 2:
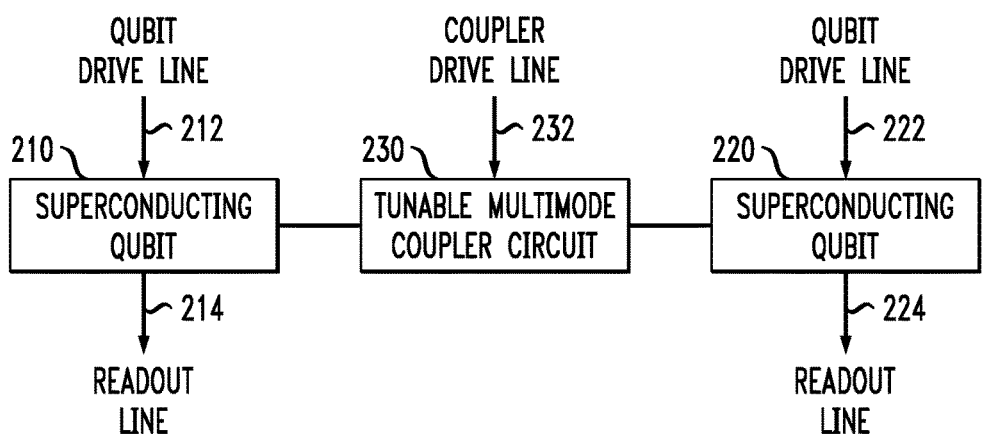
FIG. 2 schematically illustrates a quantum device comprising superconducting quantum bits that are coupled by a tunable multimode coupler circuit, according to an exemplary embodiment of the disclosure.

FIG. 2 schematically illustrates a quantum device comprising superconducting quantum bits that are coupled by a tunable multimode coupler circuit, according to an exemplary embodiment of the disclosure. In particular, FIG. 2 schematically illustrates a quantum device 200 comprising a first superconducting quantum bit 210 (or first qubit 210), a second superconducting quantum bit 220 (or second qubit 220), and a tunable multimode coupler circuit 230. In the exemplary configuration, the first and second qubits 210 and 220 comprise computational qubits, and the tunable multimode coupler circuit 230 is configured to mediate the interaction (e.g., ZZ interaction) between the first and second qubits 210 and 220 under different gate operations. In some embodiments, the first and second qubits 210 and 220 comprise superconducting transmon qubits, e.g., fixed-frequency transmon qubits. In other embodiments, the first and second qubits 210 and 220 can be other types of superconducting qubits such as superconducting fluxonium qubits. Furthermore, in other embodiments, the first and second qubits 210 can be tunable qubits, e.g., tunable transition frequencies.

Further, in some embodiments, the tunable multimode coupler circuit 230 comprises a superconducting multimode qubit which is configured to control exchange interactions between the first and second qubits 210 and 220 to implement entanglement gate operations, and to suppress crosstalk between the first and second qubits 210 and 220 during idle times (e.g., suppress static ZZ interaction) or when a single-qubit gate operation is being performed on one or both of the first and second qubits 210 and 220 (e.g., suppress ZZ interaction). In general, a superconducting multimode qubit comprises any quantum system which is composed of strongly interacting, anharmonic oscillators. The composite quantum system is characterized by multiple modes of excitations which exhibit strong longitudinal couplings amongst themselves, i.e., the excitation of one mode can strongly shift the transition frequency of another mode. As explained in further detail below, in some embodiments, the tunable multimode coupler circuit 230 is implemented using a tunable, two-junction superconducting qubit.

The quantum device 200 further comprises a plurality of control lines (e.g., transmission line resonators) including, but not limited to, qubit drive lines 212 and 222, qubit readout lines 214 and 224, and a coupler drive line 232. In some embodiments, the qubit drive lines 212 and 222 are coupled (e.g., capacitively coupled via capacitors) to the first and second qubits 210 and 220, respectively. In some embodiments, the qubit drive lines 212 and 222 are configured to apply control signals (e.g., microwave pulse signals) to independently change the states of the respective first and second qubits 210 and 220 (e.g., single-qubit gate operations). As is known in the art, the state of a qubit can be changed by applying a microwave control signal (e.g., control pulse) with a center frequency equal to a transition frequency (denoted $f_{01}$) of the qubit, wherein the transition frequency $f_{01}$ corresponds to an energy difference between the ground state |0⟩ and excited state |1⟩ of the qubit. In addition, the axis of rotation about a given axis of the Bloch sphere 100 (e.g., X-axis and/or Y-axis) and the amount (angle) of such rotation are based, respectively, on the phase of the microwave control signal, and the amplitude and duration of the microwave control signal.

Further, in some embodiments, the readout lines 214 and 224 are coupled to the first and second qubits 210 and 220, respectively, using known techniques. In some embodiments, the readout lines 214 and 224 comprise transmission line readout resonators (e.g., coplanar transmission lines) which are configured to have resonant frequencies that are detuned from the respective transition frequencies of the respective first and second qubits 210 and 220. Due to the coupling of the readout lines 214 and 224 to the respective first and second qubits 210 and 220, there is a shift in the resonant frequencies of transmission line readout resonators depending on the states of the respective first and second qubits 210 and 220. The change in resonant frequency of the transmission line readout resonator, which is coupled to a given qubit, is utilized to determine a readout state of the given qubit, e.g., ground state |0⟩ or excited state |1⟩, wherein for readout, superposition states of the given qubit are projected onto one of the ground state or excited state of the qubit, as is known in the art.

The coupler drive line 232 is coupled (e.g., inductively coupled) to the tunable multimode coupler circuit 230. In some embodiments, the tunable multimode coupler circuit 230 comprises two distinct normal modes (e.g., two distinct modes of excitations with distinct frequencies and spatial symmetries), wherein the coupler drive line 232 is configured to apply a control signal to the tunable multimode coupler circuit 230 to control mode-selective exchange coupling between the first and second qubit 210 and 220 and the different excitation modes of the tunable multimode coupler circuit 230. For example, in embodiments where the tunable multimode coupler circuit 230 comprises a first mode and a second mode, the tunable multimode coupler circuit 230 can be configured (via flux tuning) to operate a first state (e.g., "off" state) or a second state (e.g., "on" state), in response to a flux tuning control signal applied to the tunable multimode coupler circuit 230.

More specifically, in some embodiments, in the first state of the tunable multimode coupler circuit 230, the first qubit 210 is exchange coupled to the first mode, and the second qubit 220 is exchange coupled to the second mode, which suppresses the interaction (e.g., static ZZ interaction) between the first and second qubits 210 and 220. On the other hand, in the second state of the tunable multimode coupler circuit 230, the first and second qubits 210 and 220 are exchange coupled to both the first mode and the second mode, to enable interaction (e.g., ZZ interaction) between the first and second qubits 210 and 220 to perform an entanglement gate operation (e.g., CPHASE gate operation).

In this regard, when the tunable multimode coupler circuit 230 is tuned to operate in the first state (e.g., off state), the tunable multimode coupler circuit 230 suppresses exchange interactions between the first and second qubits 210 and 220 such that the state of one qubit will not affect the transition frequency of the other qubit. In other words, when the tunable multimode coupler circuit 230 is tuned to operate in the first state, the first and second qubits 210 and 220 are essentially decoupled with substantially no quantum crosstalk between first and second qubits 210 and 220. This allows single-qubit gate operations to be independently performed on the first and second qubits 210 and 220 without the inducement of coherent errors during such single-qubit gate operations that may otherwise result from the ZZ interactions between the first and second qubits 210 and 220. Accordingly, the suppression of crosstalk (e.g., ZZ interactions) achieved using the configuration of FIG. 2 allows calibration of single-qubit gate operations based on the known fixed transition frequencies of the first and second qubits 210 and 220.

It is to be noted that in embodiments where the first and second qubits 210 and 220 comprise frequency-tunable qubits (e.g., flux-tunable transmon qubits), the quantum device 200 would comprise flux bias control lines coupled (e.g., inductively coupled) to the first and second qubits 210 and 220, respectively. In such embodiments, the flux bias control lines would be configured to apply flux bias control signals to tuning structures of the first and second qubits 210 and 220 to tune the operating frequencies of the first and second qubits 210 and 220, as needed for a given application. For example, a flux-tunable transmon qubit can be implemented by replacing a transmon Josephson junction by a superconducting quantum interference device (SQUID) which forms superconducting loop (referred to as SQUID loop) through an external magnetic flux can be threaded to change the effective Josephson energy of the transmon qubit and, thus, change the transition frequency of the transmon qubit. In this regard, the flux bias control lines would be configured to applying an external magnetic flux to the SQUID loops of the transmon qubits to tune the transition frequencies of the transmon qubits.

Figure 3A:
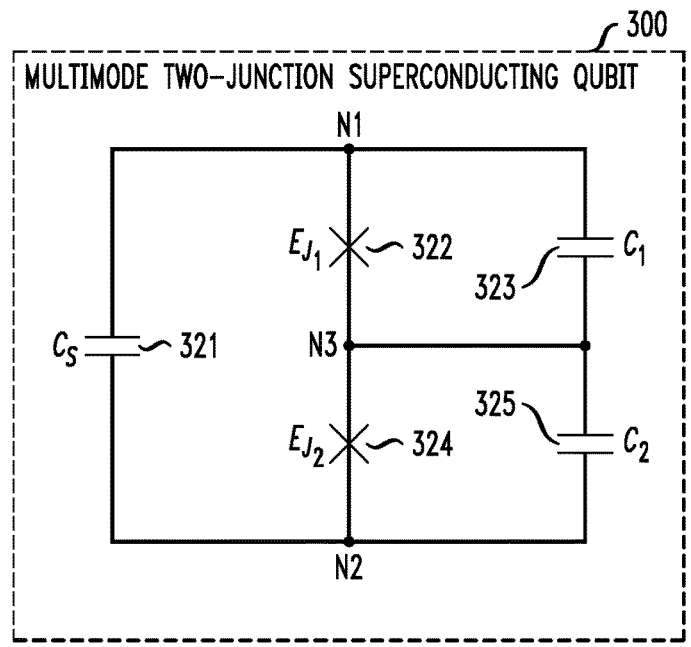
FIGS. 3A and 3B schematically illustrate a superconducting multimode, two-junction superconducting qubit, which may be utilized to implement a tunable multimode coupler circuit, according to an exemplary embodiment of the disclosure.
Figure 3B:
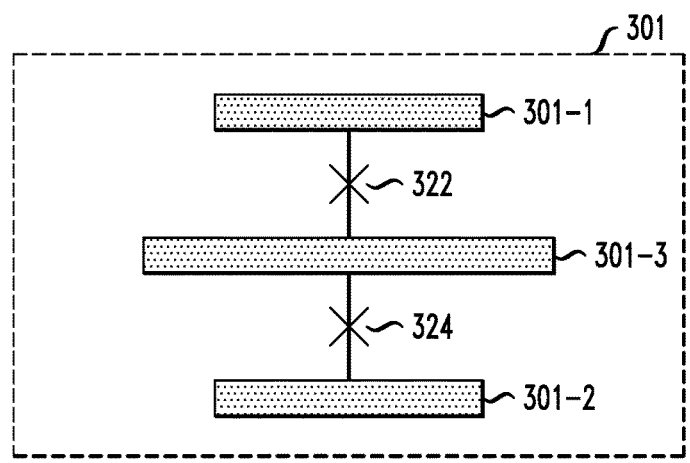

In some embodiments, as noted above, the tunable multimode coupler circuit 230 is implemented using a superconducting multimode qubit comprising a two-junction superconducting qubit architecture. For example, FIGS. 3A and 3B schematically illustrate a superconducting multimode, two-junction superconducting qubit, which may be utilized to implement the tunable multimode coupler circuit 230, according to an exemplary embodiment of the disclosure. More specifically, FIG. 3A is a schematic lumped-element circuit representation of a superconducting tunable coupler qubit (TCQ) 300 which comprises a multimode, two-junction superconducting qubit framework. The superconducting tunable coupler qubit 300 comprises a shunt capacitor 321, and two capacitively-shunted superconducting tunnel junctions (e.g., Josephson junctions) connected in series between a first node N1 and a second N2 of the superconducting tunable coupler qubit 300, wherein a first capacitively-shunted Josephson junction comprises a first Josephson junction 322 and a first capacitor 323, and wherein a second capacitively-shunted Josephson junction comprises a second Josephson junction 324 and a second capacitor 325. The shunt capacitor 321 has a capacitance $C_S$, the first Josephson junction 322 has a Josephson energy $E_{J1}$, the second Josephson junction 324 has a Josephson energy $E_{J2}$, the first capacitor 323 has a capacitance $C_1$, and the second capacitor 325 has a capacitance $C_2$. The two capacitively-shunted superconducting Josephson junctions are coupled to a middle node N3.

Next, FIG. 3B schematically illustrates a planar circuit configuration of the superconducting tunable coupler qubit 300 of FIG. 3A, according to an exemplary embodiment of the disclosure. More specifically, FIG. 3B schematically illustrates a planar superconducting tunable coupler qubit 301 comprising a first superconducting pad 301-1, a second superconducting pad 301-2, a third superconducting pad 301-3, wherein the first Josephson junction 322 is coupled between the first and third superconducting pads 301-1 and 301-3, and the second Josephson junction 324 is coupled between the second and third superconducting pads 301-2 and 301-3.

In this configuration, the superconducting pads 301-1, 301-2, and 301-3 comprise planar capacitor electrodes which form coplanar parallel-plate capacitor structures. For example, in the exemplary configuration of FIG. 3B, the first and second superconducting pads 301-1 and 301-2 comprise planar capacitor electrodes of the shunt capacitor 321 of FIG. 3A. In addition, the first and third superconducting pads 301-1 and 301-3 comprise planar capacitor electrodes of the first capacitor 323 of FIG. 3A, and the second and third superconducting pads 301-2 and 301-3 comprise planar capacitor electrodes of the second capacitor 325 of FIG. 3A. The first, second, and third superconducting pads 301-1, 301-2, and 301-3 correspond, respectively, to the first, second, and third nodes N1, N2, and N3 in FIG. 3A.

Figure 3C:
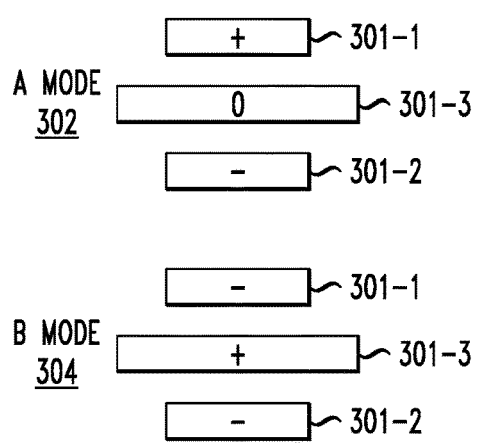
FIG. 3C schematically illustrates two distinct modes of excitations of a tunable multimode coupler circuit, according to an exemplary embodiment of the disclosure.

The tunable coupler qubit 301 comprises two modes of excitations with distinct frequencies and spatial symmetries. More specifically, the tunable coupler qubit 301 comprises two distinct modes of excitation corresponding to symmetric and antisymmetric combinations of excitations associated with the two junctions, wherein the two distinct, normal modes include (i) a low-frequency "bright" mode (referred to herein as A mode) which comprises a non-zero dipole moment, and (ii) a high-frequency "dark" mode (referred to herein as B mode) which lacks a dipole moment and does not couple to external fields. FIG. 3C schematically illustrates the two distinct modes of excitations of the tunable coupler qubit 301 of FIG. 3B, in which the "bright" mode is depicted as an A mode 302, and the "dark" mode is depicted as a B mode 304.

As schematically shown in FIG. 3C, the A mode 302 comprises a charge pattern in which, at any given point in time, the first and second superconducting pads 301-1 and 301-2 have opposite charge, and the third (middle) superconducting pad 301-3 has a net zero charge. On the other hand, the B mode 304 comprises a charge pattern in which, at any given point in time, the first and second superconducting pads 301-1 and 301-2 have the same charge, and the third (middle) superconducting pad 301-3 has a charge that is opposite the charge on the first and second superconducting pads 301-1 and 301-2. The A and B modes have different frequencies, which allows individual excitation of one mode over the other mode.

Figure 4:
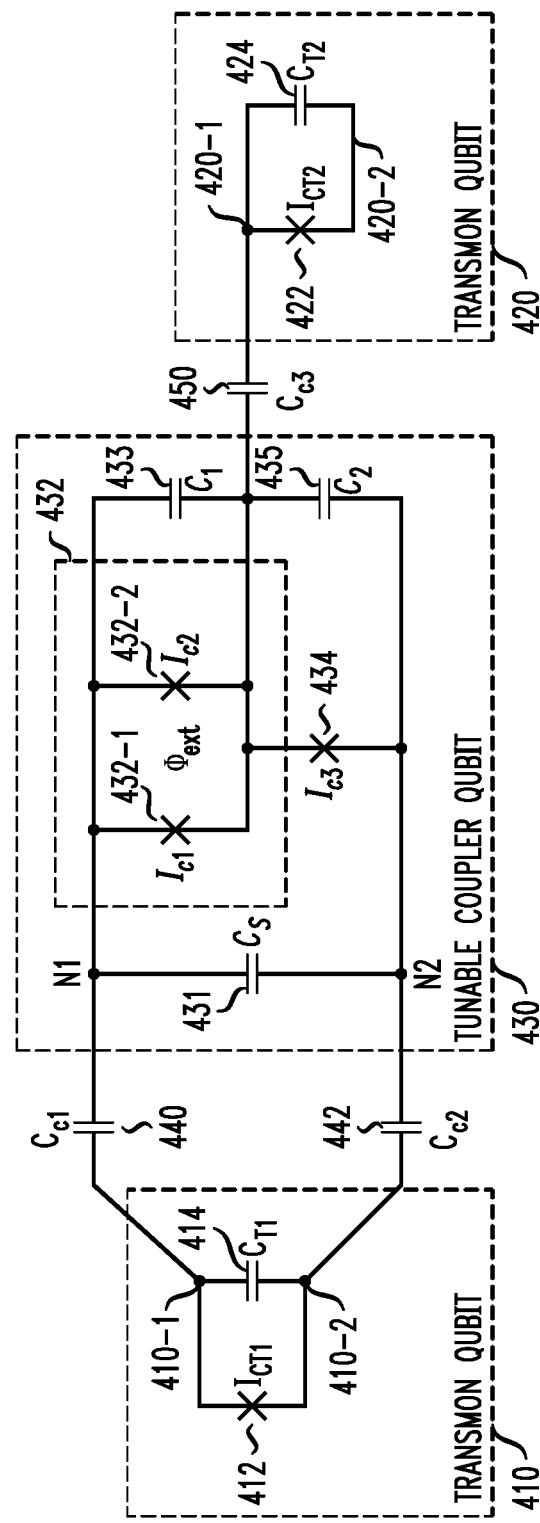
FIG. 4 schematically illustrates a circuit diagram of the quantum device of FIG. 2 in which a tunable multimode coupler circuit is implemented using a superconducting tunable coupler qubit based on the exemplary multimode, two-junction superconducting qubit framework of FIG. 3A, according to an exemplary embodiment of the disclosure.

The quantum device 200 of FIG. 2 can be implemented using different circuit architectures according to exemplary embodiments that will now be described in further detail in conjunction with FIGS. 4, 5, and 6. For example, FIG. 4 schematically illustrates a circuit diagram of the quantum device 200 of FIG. 2 in which the tunable multimode coupler circuit 230 is implemented using a superconducting tunable coupler qubit which is based on the exemplary multimode, two-junction superconducting qubit framework of FIG. 3A, according to an exemplary embodiment of the disclosure. More specifically, FIG. 4 is a schematic circuit diagram (e.g., lumped-element circuit representation) of a superconducting quantum circuit 400 comprising a first superconducting transmon qubit 410, a second superconducting transmon qubit 420, a superconducting tunable coupler qubit 430, a first coupling capacitor 440, a second coupling capacitor 442, and a third coupling capacitor 450. The superconducting tunable coupler qubit 430, the first coupling capacitor 440, the second coupling capacitor 442, and the third coupling capacitor 450 comprise an exemplary embodiment of the tunable multimode coupler circuit 230 of FIG. 2.

The first superconducting transmon qubit 410 comprises a superconducting Josephson tunnel junction 412 (with a critical current $I_{CT1}$) and shunt capacitor 414 (with a capacitance $C_{T1}$), which are connected in parallel between a first node 410-1 and a second node 410-2 of the first superconducting transmon qubit 410. Similarly, the second superconducting transmon qubit 420 comprises a superconducting Josephson tunnel junction 422 (with a critical current $I_{CT2}$) and shunt capacitor 424 (with a capacitance $C_{T2}$), which are connected in parallel between a first node 420-1 and a second node 420-2 of the second superconducting transmon qubit 420. The Josephson tunnel junctions 412 and 422 comprise respective small junction capacitances which are omitted from FIG. 4 for ease of illustration. The shunt capacitances $C_{T1}$ and $C_{T2}$ of the respective shunt capacitors 414 and 424 are large relative to the junction capacitances of the respective Josephson tunnel junctions 412 and 422.

The superconducting tunable coupler qubit 430 comprises a multimode, two-junction superconducting qubit architecture which is similar to the superconducting tunable coupler qubit 300 (FIG. 3A), except that a given one of the Josephson tunnel junctions is made flux-tunable by replacing the given Josephson tunnel junction with a SQUID device (e.g., two Josephson tunnel junctions connected in parallel). More specifically, as shown in FIG. 4, the superconducting tunable coupler qubit 430 comprises a shunt capacitor 431 (with capacitance $C_S$), and first and second capacitively-shunted superconducting Josephson tunnel junctions connected in series between a first node N1 and a second N2 of the superconducting tunable coupler qubit 430. The first capacitively-shunted Josephson tunnel junction comprises a SQUID device 432, and a first capacitor 433 (with capacitance $C_1$), and the second capacitively-shunted Josephson tunnel junction comprises a third Josephson tunnel junction 434, and a second capacitor 435 (with capacitance $C_2$). The SQUID device 432 comprises a first Josephson tunnel junction 432-1 (with a critical current $I_{C1}$) and a second Josephson tunnel junction 432-2 (with a critical current $I_{C2}$), which are connected in parallel between the first node N1 and a third node N3 of the superconducting tunable coupler qubit 430. The third Josephson tunnel junction 434 comprises a critical current of Ica.

The SQUID device 432 operates as a single Josephson tunnel junction device with a critical current that is tunable by applying an external magnetic field, Text, to a superconducting loop that is formed by the parallel-connected Josephson tunnel junctions 432-1 and 432-2. As is known in the art, the junction critical current $I_c$ of a Josephson tunnel junction is a function of Josephson energy $E_J$ of the Josephson tunnel junction, wherein the junction critical current $I_c$ denotes a maximum amount of current that can coherently tunnel through the junction (exhibiting no dissipation). In this regard, the SQUID device 432 allows the Josephson energy of the circuit to be tuned through the application of a target external magnetic field $\Phi_{ext}$ which threads through the superconducting loop.

As further shown in FIG. 4, the first coupling capacitor 440 is configured to capacitively couple the first node 410-1 of the first superconducting transmon qubit 410 to the first node N1 of superconducting tunable coupler qubit 430. Further, the second coupling capacitor 442 is configured to capacitively couple the second node 410-2 of the first superconducting transmon qubit 410 to the second node N2 of the superconducting tunable coupler qubit 430. In addition, the third coupling capacitor 450 is configured to capacitively couple the first node 420-1 of the second superconducting transmon qubit 420 to the third node N3 the superconducting tunable coupler qubit 430.

In the exemplary configuration of FIG. 4, the first superconducting transmon qubit 410 and the second superconducting transmon qubit 420 are coupled to different modes of the superconducting tunable coupler qubit 430. For example, in some embodiments, the A mode of the superconducting tunable coupler qubit 430 is selectively coupled to the first superconducting transmon qubit 410, and the B mode of the superconducting tunable coupler qubit 430 is selectively coupled to the second superconducting transmon qubit 420. In this configuration, the residual longitudinal interaction (e.g., static ZZ interaction) is substantially suppressed because the first and second superconducting transmon qubits 410 and 420 are coupled to different modes of the superconducting tunable coupler qubit 430. Furthermore, the exchange interaction between the first and second superconducting transmon qubits 410 and 420 is suppressed for a wide range of transmon frequencies as a result of the mode-selective coupling.

More specifically, the superconducting tunable coupler qubit 430 can be tuned to operate in a "off" state or an "on" state by changing an amount of magnetic flux that is applied to the superconducting loop of the SQUID device 432 to adjust a critical current $I_{CS}$ of the SQUID device 432 (and thus adjust the Josephson energy of the SQUID device 432). For example, the superconducting tunable coupler qubit 430 can be tuned to operate in a "off" state by applying an amount of external magnetic flux to the superconducting loop of the SQUID device 432 to make the critical current $I_{CS}$ of the SQUID device 432 to be equal to, or substantially equal to, the critical current $I_{C3}$ of the third Josephson tunnel junction 434. The "off" state of the superconducting tunable coupler qubit 430 enforces the mode-selective coupling and creates a condition of essentially zero interaction between the first and second superconducting transmon qubits 410 and 420. Indeed, in the "off state" of the superconducting tunable coupler qubit 430, the first superconducting transmon qubit 410 will be coupled to only the A mode of the superconducting tunable coupler qubit 430, and the second superconducting transmon qubit 420 will be coupled to only the B mode of the superconducting tunable coupler qubit 430, due to the different charge patterns of the A and B modes, such as shown in FIG. 3C.

On the other hand, the superconducting tunable coupler qubit 430 can be tuned to operate in an "on" state by applying an amount of external magnetic flux to the superconducting loop of the SQUID device 432 to make the critical current $I_{CS}$ of the SQUID device 432 unequal to (e.g., greater than) the critical current $I_{C3}$ of the third Josephson tunnel junction 434, which causes an imbalance in the Josephson energies of the third Josephson tunnel junction 434 and the effective Josephson tunnel junction of the SQUID device 432. Such imbalance in the Josephson energies alters the mode-selective coupling in way that causes both of the first and second superconducting transmon qubits 410 and 420 to have exchange coupling to both modes (A mode and B mode) of the superconducting tunable coupler qubit 430. This exchange coupling results in generating ZZ interaction between the first and second superconducting transmon qubits 410 and 420, which allows a CPHASE gate operation between the first and second superconducting transmon qubits 410 and 420.

More specifically, in some embodiments, the superconducting tunable coupler qubit 430 can be tuned to operate in an "on" state by applying an external magnetic field threading the SQUID device 432 to increase the critical current $I_{CS}$ of the SQUID device 432 to be greater than the fixed critical current $I_{C3}$ of the third Josephson tunnel junction 434. The increase in the critical current $I_{CS}$ of the SQUID device 432 causes an increase in the energy of the A and B modes, which essentially breaks the mode-selective coupling of the first and second superconducting transmon qubits 410 and 420 to the superconducting tunable coupler qubit 430. In this case, the first and second superconducting transmon qubits 410 and 420 will have exchange coupling to both the A and B modes of the superconducting tunable coupler qubit 430, resulting ZZ interaction between the first and second superconducting transmon qubits 410 and 420. In this regard, the superconducting tunable coupler qubit 430 can be properly tuned to mediate an entangling gate operation (e.g., CPHASE gate operation) between the first and second superconducting transmon qubits 410 and 420.

The exemplary superconducting quantum circuit 400 shown in FIG. 4 can be implemented using planar microwave circuit elements that are formed on a substrate (e.g., silicon substrate) using state-of-the-art semiconductor fabrication techniques and materials. For example, the various components of the superconducting qubits (e.g., Josephson tunnel junction devices, inductors, capacitors), interconnects, coupling circuitry, coupler drive lines, qubit drive lines, and the state readout lines, etc., comprise lithographically defined patterns of superconducting materials formed on semiconductor substrate. The circuit elements can be formed using various types of superconductor materials that are suitable for a given application, including, but not limited to, elementary metals such as niobium (Nb), aluminum (Al), tantalum (Ta), and compounds such as titanium nitride (TiN), niobium nitride (NbN), niobium titanium nitride (NbTiN), etc. A Josephson tunnel junction device comprises two superconducting electrodes that are separated by a thin insulating barrier. For example, a Josephson tunnel junction device for a superconducting qubit may comprise an Al—AlO$_x$—Al trilayer tunnel junction that is fabricated using a double-angle evaporation technique, or other suitable fabrication techniques.

Figure 5:
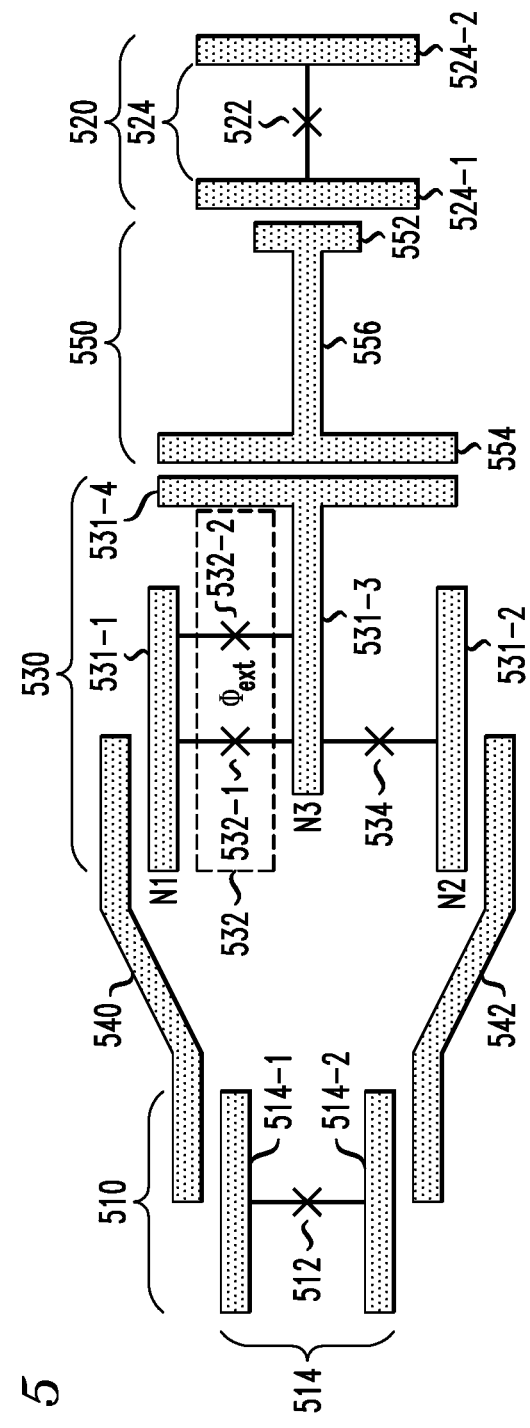
FIG. 5 schematically illustrates a planar circuit configuration of the superconducting quantum circuit of FIG. 4, according to an exemplary embodiment of the disclosure.

FIG. 5 schematically illustrates a planar circuit configuration of the superconducting quantum circuit 400 of FIG. 4, according to an exemplary embodiment of the disclosure.

More specifically, FIG. 5 schematically illustrates a planar superconducting quantum circuit 500 comprising a first superconducting transmon qubit 510, a second superconducting transmon qubit 520, a superconducting tunable coupler qubit 530, a first superconducting coupling capacitor 540, a second superconducting coupling capacitor 542, and a third superconducting coupling capacitor 550.

The first superconducting transmon qubit 510 comprises a Josephson tunnel junction device 512, and a shunt capacitor 514. In some embodiments, the shunt capacitor 514 comprises a coplanar parallel-plate capacitor structure comprising a first superconducting pad 514-1 (or first electrode), and a second superconducting pad 514-2 (or second electrode). The Josephson tunnel junction device 512 comprises first and second superconducting electrodes that are coupled to the first and second superconducting pads 514-1 and 514-2, respectively, of the shunt capacitor 514. In some embodiments, as schematically illustrated in FIG. 5, the Josephson tunnel junction device 512 is disposed between the first and second superconducting pads 514-1 and 514-2 of the shunt capacitor 514.

Similarly, the second superconducting transmon qubit 520 comprises a Josephson tunnel junction device 522, and a shunt capacitor 524. In some embodiments, the shunt capacitor 524 comprises a coplanar parallel-plate capacitor structure comprising a first superconducting pad 524-1 (or first electrode), and a second superconducting pad 524-2 (or second electrode). The Josephson tunnel junction device 522 comprises first and second superconducting electrodes that are coupled to the first and second superconducting pads 524-1 and 524-2, respectively, of the shunt capacitor 524. In some embodiments, as schematically illustrated in FIG. 5, the Josephson tunnel junction device 522 is disposed between the first and second superconducting pads 524-1 and 524-2 of the capacitor 524.

The superconducting tunable coupler qubit 530 comprises a first superconducting pad 531-1, a second superconducting pad 531-2, a third superconducting pad 531-3, a fourth superconducting pad 531-4, a SQUID device 532 (which comprises a first Josephson tunnel junction device 532-1, and a second Josephson tunnel junction device 532-2), and a third Josephson tunnel junction device 534. The first and second superconducting pads 531-1 and 531-2 comprise electrodes of a coplanar parallel-plate capacitor structure which corresponds to the shunt capacitor 431 (FIG. 4) which provides the shunt capacitance $C_S$.

Further, the first and second Josephson tunnel junction devices 532-1 and 532-2 of the SQUID device 532 are coupled to, and disposed between, the first and third superconducting pads 531-1 and 531-3, thus forming a superconducting loop through which an external magnetic flux $\Phi_{ext}$ is threaded to tune the operating state of the superconducting tunable coupler qubit 530, as discussed herein. The first and third superconducting pads 531-1 and 531-3 comprise electrodes of a coplanar parallel-plate capacitor structure which corresponds to the first capacitor 433 (FIG. 4), thereby providing the shunt capacitance $C_1$ across the effective Josephson junction formed by the parallel connected first and second Josephson tunnel junction devices 532-1 and 532-2 of the SQUID device 532. Moreover, the third Josephson tunnel junction device 534 is coupled to, and disposed between, the second and third superconducting pads 531-2 and 531-3. The second and third superconducting pads 531-2 and 531-3 comprise electrodes of a coplanar parallel-plate capacitor structure which corresponds to the second capacitor 435 (FIG. 4), thereby providing the shunt capacitance $C_2$ across the Josephson tunnel junction device 534.

As further shown in the exemplary embodiment of FIG. 5, the first superconducting coupling capacitor 540 (which corresponds to the coupling capacitor 440 of FIG. 4) comprises a superconducting planar transmission line, such as a coplanar waveguide, which is configured to capacitively couple the first superconducting pad 514-1 of the shunt capacitor 514 of the first superconducting transmon qubit 510 to the first superconducting pad 531-1 (e.g., node N1) of the superconducting tunable coupler qubit 530. The first superconducting coupling capacitor 540 comprises (i) a first end portion which overlaps a portion of the first superconducting pad 514-1 of the shunt capacitor 514 of the first superconducting transmon qubit 510, and (ii) a second end portion which overlaps a portion of the first superconducting pad 531-1 of the superconducting tunable coupler qubit 530. The amount of coupling capacitance (e.g., $C_{C1}$) provided by first superconducting coupling capacitor 540 depends at least in part on the amount of overlap and spacing between the end portions of the first superconducting coupling capacitor 540 and the first superconducting pads 514-1 and 531-1.

Similarly, the second superconducting coupling capacitor 542 (which corresponds to the coupling capacitor 442 of FIG. 4) comprises a superconducting planar transmission line, such as a coplanar waveguide, which is configured to capacitively couple the second superconducting pad 514-2 of the shunt capacitor 514 of the first superconducting transmon qubit 510 to the second superconducting pad 531-2 (e.g., node N2) of the superconducting tunable coupler qubit 530. The second superconducting coupling capacitor 542 comprises (i) a first end portion which overlaps a portion of the second superconducting pad 514-2 of the shunt capacitor 514 of the first superconducting transmon qubit 510, and (ii) a second end portion which overlaps a portion of the second superconducting pad 531-2 of the superconducting tunable coupler qubit 530. The amount of coupling capacitance (e.g., $C_{C2}$) provided by second superconducting coupling capacitor 542 depends at least in part on the amount of overlap and spacing between the end portions of the second superconducting coupling capacitor 542 and the second superconducting pads 514-2 and 531-2.

The third superconducting coupling capacitor 550 (which corresponds to the coupling capacitor 450 of FIG. 4) comprises a first superconducting pad 552 (or first coupling electrode), a second superconducting pad 554 (or second coupling electrode), which are connected by a superconducting planar transmission line 556 (e.g., coplanar waveguide). The first superconducting pad 552 is capacitively coupled to the first superconducting pad 524-1 of the shunt capacitor 524 of the second superconducting transmon qubit 520. The second superconducting pad 554 is capacitively coupled to the fourth superconducting pad 531-4 of the superconducting tunable coupler qubit 530, wherein the fourth superconducting pad 531-4 is connected to an end of the third superconducting pad 531-3 (e.g., node N3). In this exemplary configuration, the first superconducting pad 524-1 of the shunt capacitor 524 of the second superconducting transmon qubit 520 is capacitively coupled to the third superconducting pad 531-3 (e.g., third node N1) of the superconducting tunable coupler qubit 530. The amount of coupling capacitance (e.g., $C_{C3}$) provided by third superconducting coupling capacitor 550 depends at least in part on (i) the amount of capacitive coupling between the superconducting pads 552 and 524-1, and (ii) the amount of capacitive coupling between the superconducting pads 554 and 531-4.

The various superconducting circuit elements of the superconducting quantum circuits 400 and 500 in FIGS. 4 and 5 can be configured to achieve desired operating characteristics. In some embodiments, the first and second superconducting transmon qubits 410 and 420 comprise fixed-frequency transmon qubits with different transition frequencies. For example, with reference to the circuit configuration of FIG. 4, in an exemplary non-limiting embodiment, the first superconducting transmon qubit 410 is configured to have a transition frequency of $f_{Q1}$=5.45 GHz, and the second superconducting transmon qubit 420 is configured to have a transition frequency of $f_{Q2}$=5.55 GHz. The desired operating characteristics (e.g., transition frequency, anharmonicity, etc.) of the first superconducting transmon qubit 410 are obtained based on, e.g., the capacitance value $C_{T1}$ of the shunt capacitor 414, and the critical current $I_{CT1}$ of the Josephson tunnel junction device 412. Similarly, the desired operating characteristics (e.g., transition frequency, anharmonicity, etc.) of the second superconducting transmon qubit 420 are obtained based on, e.g., the capacitance value $C_{T2}$ of the shunt capacitor 424, and the critical current $I_{CT2}$ of the Josephson tunnel junction device 422.

In addition, the first, second, and third coupling capacitors 440, 442, and 450 are configured to enable exchange coupling of the first and second superconducting transmon qubits 410 and 420 to the different modes of the superconducting tunable coupler qubit 430. The capacitance values of the first, second, and third coupling capacitors 440, 442, and 450 are selected to achieve a desired amount exchange coupling between the superconducting tunable coupler qubit 430 and the first and second superconducting transmon qubits 410 and 420. In an exemplary non-limiting embodiment, the first, second, and third coupling capacitors 440, 442, and 450 are configured to have the same or substantially the same capacitance value.

Further, the superconducting tunable coupler qubit 430 is configured to have an A mode frequency ($f_A$) and a B mode frequency ($f_B$) which are detuned by a desired amount. For example, in an exemplary non-limiting embodiment, the transition frequency of the A mode is $f_A$=3.6 GHz, and the transition frequency of the B mode is $f_B$=4.6 GHz. In general, the desired operating characteristics of the superconducting tunable coupler qubit 430 (e.g., A mode frequency ($f_A$), B mode frequency ($f_B$), anharmonicities, tuning range, etc.) are obtained based on, e.g., the capacitance value $C_S$ of the shunt capacitor 431, the capacitance value $C_1$ of the first capacitor 433 which shunts the SQUID device 432, the capacitance value $C_2$ of the second capacitor 435 which shunts the third Josephson tunnel junction device 434, the critical currents $I_{C1}$ and $I_{C2}$ of the respective first and second Josephson tunnel junction devices 432-1 and 432-2 of the SQUID device 432, and the critical current $I_{C3}$ of the third Josephson tunnel junction device 434.

In an exemplary non-limiting embodiment, the critical currents $I_{C1}$ and $I_{C2}$ of the first and second Josephson tunnel junction devices 432-1 and 432-2 are selected such that the critical current $I_{C1}$ is less than the critical current $I_{C2}$ (i.e., $I_{C1} < I_{C2}$), and the critical current $I_{C3}$ of the third Josephson tunnel junction device 434 is selected such that $I_{C1} < I_{C3} < I_{C2}$. The selection of the exemplary critical current values of $I_{C1}$ and $I_{C2}$, with $I_{C1} < I_{C2}$, allows the effective critical current $I_{CS}$ of the SQUID device 432 to be flux-tuned over a target range of $I_{CS}$ values, by varying the magnitude of the external magnetic flux $\Phi_{ext}$ in a range from about 0.5 magnetic flux quantum to about 0 magnetic flux.

In some embodiments, as shown above, the normal A and B modes of the superconducting tunable coupler qubit 430 have frequencies that are below the transition frequencies of the first and second superconducting transmon qubits 410 and 420 when, e.g., the superconducting tunable coupler qubit 430 is flux-tuned in the "off" state. As noted above, in the "off" state, the first and second superconducting transmon qubits 410 and 420 are exchange coupled to different modes of the superconducting tunable coupler qubit 430, which completely or substantially suppresses ZZ interaction between the first and second superconducting transmon qubits 410 and 420.

On the other hand, when the superconducting tunable coupler qubit 430 is flux-tuned in the "on" state, the frequencies of the A and B modes of the superconducting tunable coupler qubit 430 increase closer to the transition frequencies of the first and second first and second superconducting transmon qubits 410 and 420, which results in a transformation of the charge patterns of the A and B modes in which the B mode develops a net dipole moment (and is no longer in full "dark" mode). This transformation of the A and B modes (e.g., increase in mode frequencies, change in charge patterns, etc.) causes the first and second superconducting transmon qubits 410 and 420 to have exchange coupling with both the A and B modes, which enables and mediates the ZZ interaction between the first and second superconducting transmon qubits 410 and 420 to implement an entanglement gate operation.

Advantageously, the flux tuning of the multimode coupler circuit can be achieved with relatively low bandwidth signals (e.g., DC or less than 100 MHz). With this configuration, the superconducting tunable coupler qubit 430 is configured to have A and B mode frequencies (in the "off" state) which are below the transition frequencies of the first and second superconducting transmon qubits 410 and 420, while the superconducting tunable coupler qubit 430 is flux-tuned in the "off" state using DC or low bandwidth control signals. In this regard, the relatively large detuning between the AB mode frequencies and the transmon qubit transition frequencies, in conjunction with using DC or low bandwidth control signals to maintain the flux-tuning of the superconducting tunable coupler qubit 430 in the "off" state, prevents disturbance of the states of the first and second superconducting transmon qubits 410 and 420 when the superconducting tunable coupler qubit 430 is tuned in the "off" state.

On the other hand, as compared to flux-tuning, microwave tuning of a superconducting tunable coupler qubit can be problematic for various reasons. For example, to implement microwave tuning of a superconducting tunable coupler qubit (without a SQUID) such as shown in FIG. 3A, the superconducting tunable coupler qubit would be configured with A and B modes having frequencies close to the transition frequencies of, e.g., the first and second superconducting transmon qubits 410 and 420, wherein the A and B mode frequencies would be fixed. In this instance, to implement an entanglement gate, the superconducting tunable coupler qubit would need to be driven with a microwave signal having a frequency close to the transition frequencies of the superconducting transmon qubits 410 and 420, which can potentially result in disturbance of the states of the coupled qubits or near neighbor qubits, etc.

A computer simulation was performed to illustrate exchange interaction (e.g., ZZ interaction) characteristics for a transmon-coupler-transmon quantum system (e.g., FIG. 4) based on exemplary set of numerical values and operating characteristics as presented above. The result of such computer simulation is graphically illustrated in FIG. 6. It is to be understood that the computer simulation results shown in FIG. 6 depict operational characteristics of an exemplary system based the non-limiting exemplary set of numerical values as presented above for illustrative purposes, and should not be construed in any limiting manner with regard to the scope of the claimed subject matter. FIG. 6 depicts a graph 600 showing an amount of ZZ interaction (Y-axis) between the coupled superconducting transmon qubits as a function of SQUID critical current $I_{CS}$ (X-axis). More specially, FIG. 6 shows a curve 602 which depicts an amount of static ZZ interaction between the first and second superconducting transmon qubits 410 and 420 in which the superconducting tunable coupler qubit 430 is flux-tuned over a range of SQUID critical currents $I_{CS}$ from 30 nA to 100 nA. In particular, the curve 602 illustrates an amount of ZZ interaction between the first and second superconducting transmon qubits 410 and 420 with the superconducting tunable coupler qubit 430 tuned at different states, e.g., "on" state and "off" state.

As previously discussed in conjunction with FIG. 4, the superconducting tunable coupler qubit 430 can be tuned to operate in a "off" state by applying an amount of external magnetic flux to the superconducting loop of the SQUID device 432 to make the critical current $I_{CS}$ of the SQUID device 432 to be equal to, or substantially equal to, the critical current $I_{C3}$ of the third Josephson tunnel junction device 434. Assuming that the third Josephson tunnel junction device 434 has a critical current of $I_{C3}$=40 nA, as shown in FIG. 6, the superconducting tunable coupler qubit 430 will be in an "off" state when the SQUID critical current is $I_{CS}$=$I_{C3}$=40 nA. In the "off" state, the exchange interaction between the first and second superconducting transmon qubits 410 and 420 is tuned to be zero, or substantially zero, due to the mode-selective coupling. In addition, in the "off" state, as shown in FIG. 6, the amount of static ZZ interaction between the first and second superconducting transmon qubits 410 and 420 is less than 0.1 kHz.

Figure 6:
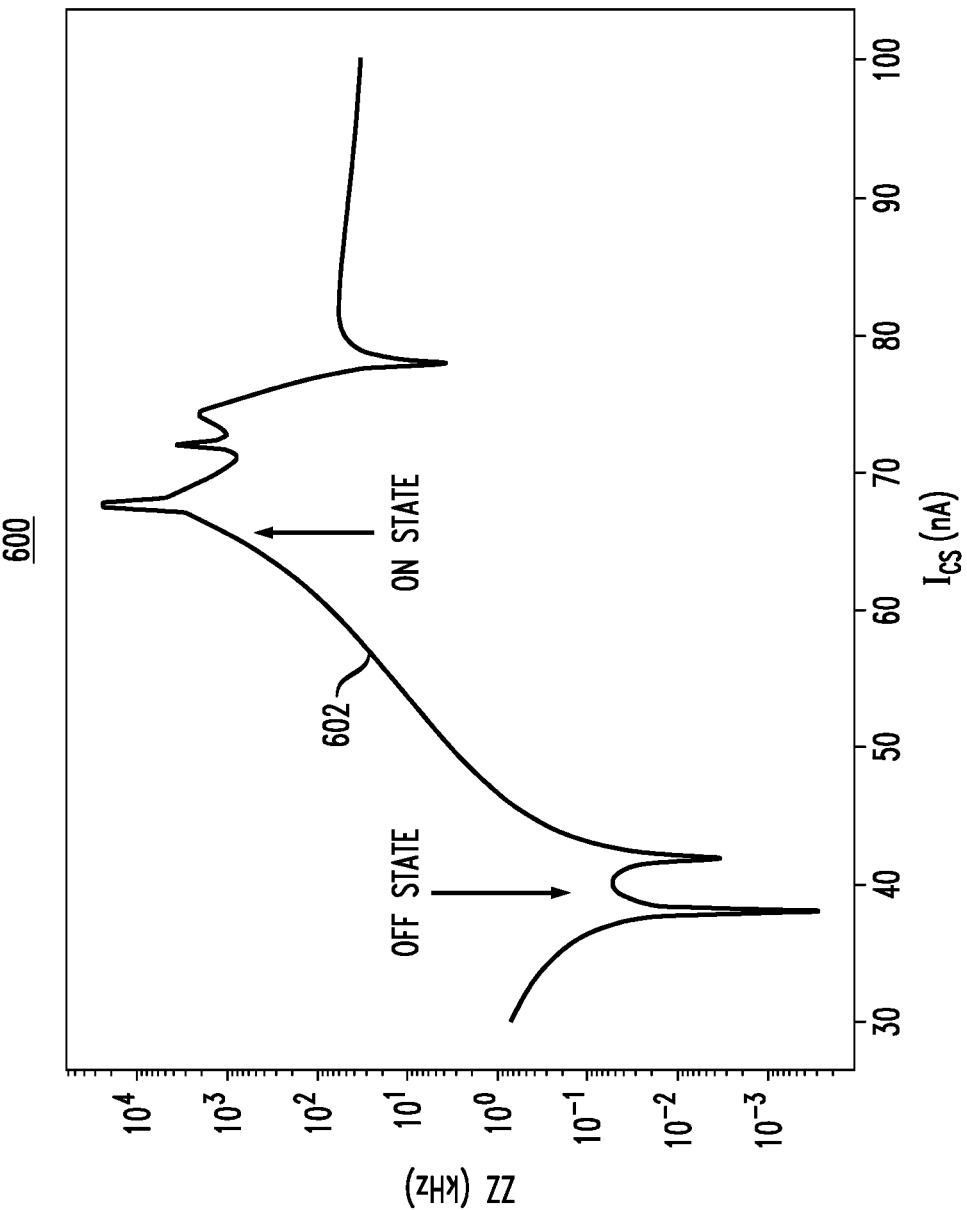
FIG. 6 graphically illustrates a process of controlling ZZ interactions between superconducting quantum bits that are coupled by a tunable multimode coupler circuit, according to an exemplary embodiment of the disclosure.

As further shown in FIG. 6, as the SQUID critical current $I_{CS}$ is increased to about 65 nA (which is greater than the fixed critical current $I_{C3}$ of the third Josephson tunnel junction device 434), the superconducting tunable coupler qubit 430 is tuned to the "on" state due to the imbalance in the Josephson energies of the SQUID and the third Josephson tunnel junction device 434, which alters the mode-selective coupling in way that causes both of the first and second superconducting transmon qubits 410 and 420 to have exchange coupling to both modes (A mode and B mode) of the superconducting tunable coupler qubit 430. As shown by the curve 602 in FIG. 6, such exchange coupling results in a ZZ interaction of greater than 1 MHz between the first and second superconducting transmon qubits 410 and 420, which enables the implementation of a fast two-bit gate operation, e.g., CPHASE gate operation, between the first and second superconducting transmon qubits 410 and 420.

Figure 7:
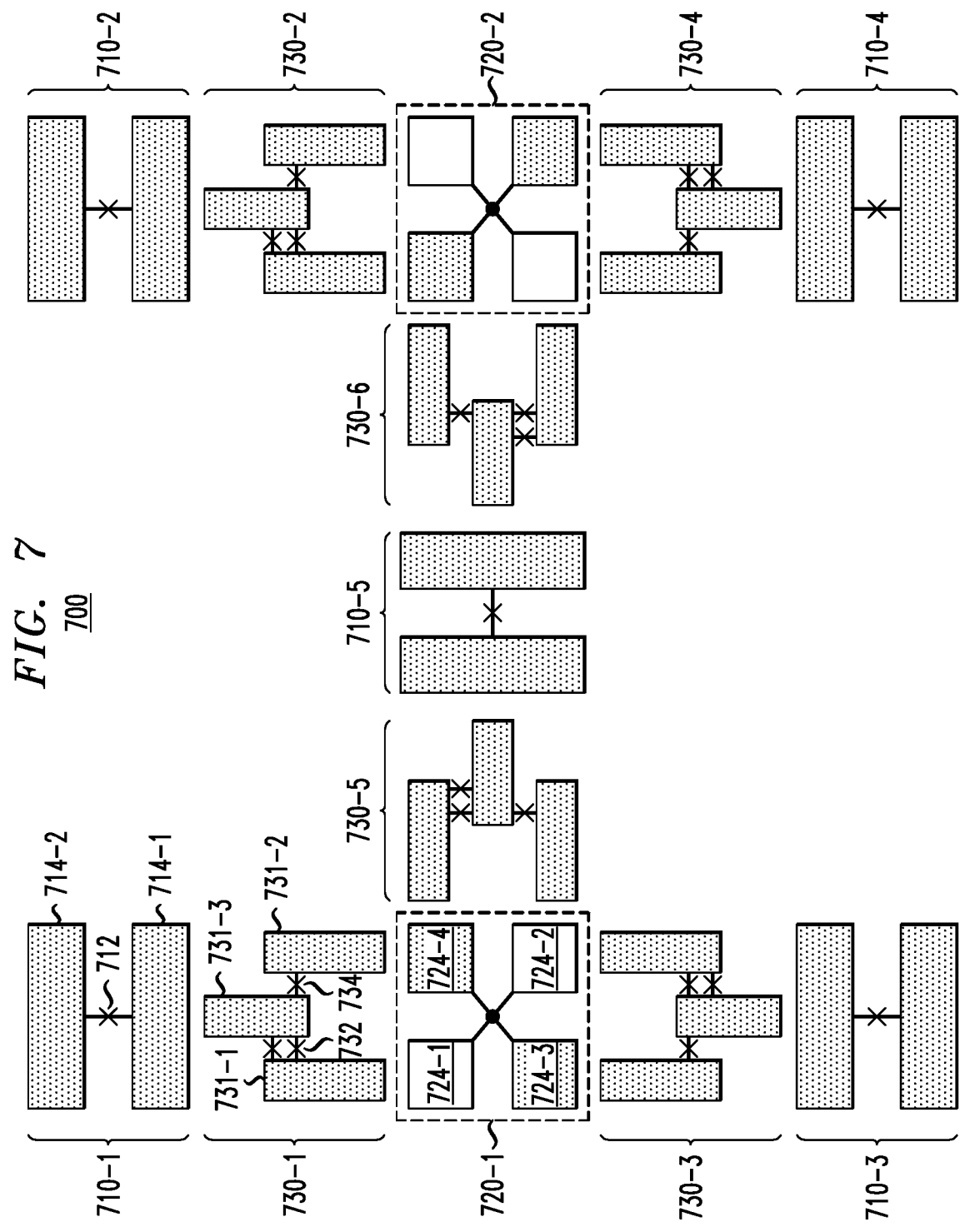
FIG. 7 schematically illustrates an array of superconducting quantum bits that are coupled by tunable multimode coupler circuits, according to an exemplary embodiment of the disclosure.

While FIG. 5 schematically illustrates a planar superconducting quantum circuit 500 comprising two superconducting transmon qubits coupled by a superconducting tunable coupler qubit, it is to be understood that a superconducting quantum device, such as a quantum processor, can be implemented using an array of superconducting qubits comprising tens, hundreds, or thousands or more of coupled superconducting qubits, depending on the application. For example, FIG. 7 schematically illustrates an array of superconducting quantum bits that are coupled by tunable multimode coupler circuits, according to an exemplary embodiment of the disclosure. More specifically, FIG. 7 schematically illustrates a multi-qubit array 700 comprising a plurality of superconducting transmon qubits 710-1, 710-2, 710-3, 710-4, and 710-5, a plurality of superconducting quadrupole transmon qubits 720-1 and 720-2, and a plurality of superconducting tunable coupler qubits 730-1, 730-2, 730-3, 730-4, 730-5, and 730-6.

In an exemplary embodiment, FIG. 7 illustrates an exemplary layout of a unit cell comprising a heavy hexagonal lattice structure, as is known in the art. The heavy hexagonal lattice layout is particularly suitable for superconducting qubit architectures to minimize frequency collisions and crosstalk between qubits (the term "heavy" describes the exemplary layout in which qubits are placed on both vertices and edges of a hexagonal lattice). In the exemplary embodiment of FIG. 7, the heavy hexagonal lattice structure is facilitated by the use of the superconducting quadrupole transmon qubits 720-1 and 720-2, where each superconducting quadrupole transmon qubit 720-1 and 720-2 allows dipole-dipole interaction with three superconducting tunable coupler qubits, as shown.

As schematically illustrated in FIG. 7, the superconducting transmon qubits 710-1, 710-2, 710-3, 710-4, and 710-5 each comprise a layout which is similar to the exemplary layout of the first and second transmon qubits 510 and 520 as discussed above in conjunction with FIG. 6. For example, as specifically shown in FIG. 7, the superconducting transmon qubit 710-1 comprises a Josephson tunnel junction device 712, and a shunt capacitor (a coplanar parallel-plate capacitor structure) comprising a first superconducting pad 714-1 and second superconducting pad 714-2, wherein the Josephson tunnel junction device 712 comprises first and second superconducting electrodes that are coupled to the first and second superconducting pads 714-1 and 714-2, respectively, of the shunt capacitor.

In addition, the superconducting tunable coupler qubits 730-1, 730-2, 730-3, 730-4, 730-5, and 730-6 each comprises a layout which is similar to the superconducting tunable coupler qubit 530 as discussed above in conjunction with FIG. 5. For example, as specifically shown in FIG. 7, the superconducting tunable coupler qubit 730-1 comprises a first superconducting pad 731-1, a second superconducting pad 731-2, a third superconducting pad 731-3, a SQUID device 732 (which comprises a first and second Josephson tunnel junction devices that are coupled to form a superconducting loop), and a third Josephson tunnel junction device 734.

In the exemplary layout of FIG. 7, the superconducting transmon qubits 710-1, 710-2, 710-3, 710-4, and 710-5 are directly coupled to respective ones of the superconducting tunable coupler qubits 730-1, 730-2, 730-3, 730-4, 730-5, and 730-6, without the use of a separate superconducting coupling capacitor 550, such as shown in FIG. 5. For example, the superconducting transmon qubit 710-1 is directly coupled to the superconducting tunable coupler qubit 730-1 by virtue of the direct coupling of (i) the first superconducting pad 714-1 of the superconducting transmon qubit 710-1 and (ii) the third superconducting pad 731-3 of the superconducting tunable coupler qubit 730-1. In the exemplary embodiment of FIG. 7, each superconducting transmon qubit 710-1, 710-2, 710-3, 710-4, and 710-5 is directly coupled to the B mode of one or more superconducting tunable coupler qubits.

As noted above, each superconducting quadrupole transmon qubit 720-1 and 720-2 is configured to enable dipole-dipole interaction with three superconducting tunable coupler qubits. The superconducting quadrupole transmon qubit 720-1 operates in a similar manner to the superconducting transmon qubits 710-1, 710-2, 710-3, 710-4, and 710-5, except that the superconducting quadrupole transmon qubit 720-1 comprises a different arrangement of the shunt capacitor pads, which have a quadrupole charge pattern when excited. For example, as illustrated in FIG. 7, the superconducting quadrupole transmon qubit 720-1 comprises a single Josephson tunnel junction device 722, having a Manhattan Josephson junction framework, and first, second, third and fourth superconducting pads 724-1, 724-2, 724-3, and 724-4, which collectively comprise capacitor electrode pads that form a shunt capacitor of the superconducting quadrupole transmon qubit 720-1.

The first, second, third and fourth superconducting pads 724-1, 724-2, 724-3, and 724-4 of the superconducting quadrupole transmon qubit 720-1 are arranged in a rectangular array. The first and second superconducting pads 724-1 and 724-2 are configured to implement a first capacitor electrode of the shunt capacitor, and are commonly connected to a first electrode of the single Josephson tunnel junction device 722. The third and fourth superconducting pads 724-3 and 724-4 are configured to implement a second capacitor electrode of the shunt capacitor, and are commonly connected to a second electrode of the single Josephson tunnel junction device 722. In this configuration, as shown in FIG. 7, the superconducting quadrupole transmon qubit 720-1 is configured to directly couple to the A mode of each of the three superconducting tunable coupler qubits 730-1, 730-3, and 730-5. For example, the first superconducting pad 731-1 and the second superconducting pad 732-2 of the superconducting tunable coupler qubit 730-1 are directly coupled, respectively, to the first super conducting pad 724-1 and the fourth superconducting pad 724-4 of the superconducting quadrupole transmon qubit 720-1.

As noted above, the heavy hexagonal lattice structure of the multi-qubit array 700 shown in FIG. 7 is facilitated by the use of the superconducting quadrupole transmon qubits 720-1 and 720-2, since each superconducting quadrupole transmon qubit can be coupled to three superconducting tunable coupler qubits to implement the unit cell layout of the multi-qubit array 700, which comprises seven (7) superconducting transmon qubits. It is to be understood that a larger multiqubit array can be implemented by adding one more heavy hexagonal unit cells to the array shown in FIG. 7. For example, in embodiments, the multi-qubit array 700 can be expanded by coupling (B mode coupling) one or more of the superconducting transmon qubits 710-1, 710-2, 710-3, and 710-4 to a respective superconducting tunable coupler qubit to expand the heavy hexagonal lattice structure. In addition, the multi-qubit array 700 can be expanded by coupling (A mode coupling) additional superconducting tunable coupler qubits to each of the superconducting quadrupole transmon qubits 720-1 and 720-2 to expand the heavy hexagonal lattice structure (in which case, each superconducting quadrupole transmon qubits 720-1 and 720-2 would be coupled to four (4) superconducting tunable coupler qubits. In other embodiments, a heavy square lattice can be implemented by coupling four (4) superconducting tunable coupler qubits to each superconducting quadrupole transmon qubit.

Figure 8:
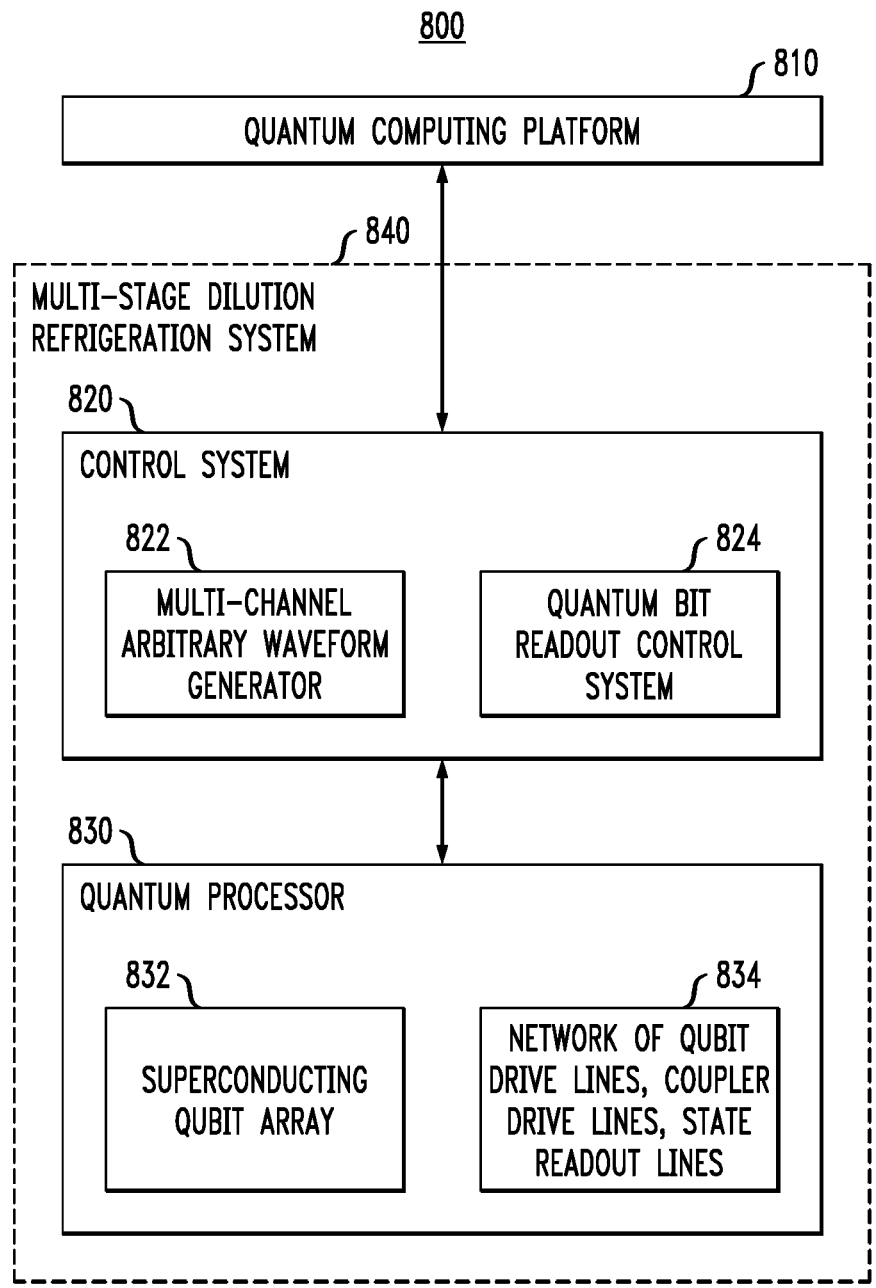
FIG. 8 schematically illustrates a quantum computing system, according to an exemplary embodiment of the disclosure.

Next, FIG. 8 schematically illustrates a quantum computing system, according to an exemplary embodiment of the disclosure. In particular, FIG. 8 schematically illustrates a quantum computing system 800 which comprises a quantum computing platform 810, a control system 820, and a quantum processor 830. In some embodiments, the control system 820 comprises a multi-channel arbitrary waveform generator 822, and a quantum bit readout control system 824. The quantum processor 830 comprises a solid-state semiconductor chip having a superconducting qubit array 832 and a network 834 of qubit drive lines, coupler drive lines, and qubit state readout lines, and other circuit QED components that may be needed for a given application or quantum system configuration.

In some embodiments, the control system 820 and the quantum processor 830 are disposed in a dilution refrigeration system 840 which can generate cryogenic temperatures that are sufficient to operate components of the control system 820 for quantum computing applications. For example, the quantum processor 830 may need to be cooled down to near-absolute zero, e.g., 10-15 millikelvin (mK), to allow the superconducting qubits to exhibit quantum behaviors. In some embodiments, the dilution refrigeration system 840 comprises a multi-stage dilution refrigerator where the components of the control system 820 can be maintained at different cryogenic temperatures, as needed. For example, while the quantum processor 830 may need to be cooled down to, e.g., 10-15 mK, the circuit components of the control system 820 may be operated at cryogenic temperatures greater than 10-15 mK, depending on the configuration of the quantum computing system.

In some embodiments, the superconducting qubit array 832 comprises a plurality of superconducting transmon qubits and superconducting tunable coupler qubits, in which pairs of superconducting transmon qubits are connected by a respective superconducting tunable coupler qubit, using techniques as discussed herein. For example, in some embodiments, the superconducting qubit array 832 implements the multi-qubit array 700 of FIG. 7. As noted above, the superconducting tunable coupler qubits are configured to control interactions between spatially separated pairs of superconducting qubits to implement entanglement gate operations. The number of superconducting qubits of the qubit array 832 can be on the order of tens, hundreds, thousands, or more, etc.

The network 834 of qubit drive lines, coupler drive lines, and qubit state readout lines, etc., are configured to applying microwave control signals to superconducting qubits and coupler circuitry in the superconducting qubit array 832 to perform various types of gate operations, e.g., single-gate operations, entanglement gate operations (e.g., CPHASE gate operation), etc., as well read the quantum states of the superconducting qubits. More specifically, as noted above, flux bias lines are utilized to apply a magnetic flux to respective superconducting qubits to tune/change the operating frequencies (e.g., transition frequencies) of the superconducting qubits for purposes of, e.g., executing certain quantum information processing algorithms. Furthermore, microwave control pulses are applied to the qubit drive lines of respective superconducting qubits to change the quantum state of the superconducting qubits (e.g., change the quantum state of a given qubit between the ground state and excited state, or to a superposition state). In particular, as noted above, the qubit drive line for a given superconducting qubit is utilized to modify the state of the given superconducting qubit by applying a microwave drive pulse with a center frequency that matches the operating frequency of the given superconducting qubit. In addition, microwave control pulses are applied to the coupler drive lines to tune the superconducting tunable coupler qubits to operate in on/off states to control exchange interactions for entanglement gate operations between pairs of coupled superconducting qubits, when executing certain quantum information processing algorithms, and to suppress exchange interactions between coupled superconducting qubits during idle times or when performing single-qubit gate operations.

Furthermore, as noted above, the state readout lines comprise readout resonators that are coupled to respective superconducting qubits. The state of a given superconducting qubit can be determined through microwave transmission measurements made between readout ports of the readout resonator. The states of the superconducting qubits are read out after executing a quantum algorithm. In some embodiments, a dispersive readout operation is performed in which a change in the resonant frequency of a given readout resonator, which is coupled to a given superconducting qubit, is utilized to readout the state (e.g., ground or excited state) of the given superconducting qubit.

The network 834 of qubit drive lines, coupler drive lines, and qubit state readout lines, etc., is coupled to the control system 820 through a suitable hardware input/output (I/O) interface, which couples I/O signals between the control system 820 and the quantum processor 830. For example, the hardware I/O interface may comprise various types of hardware and components, such as RF cables, wiring, RF elements, optical fibers, heat exchanges, filters, amplifiers, isolators, etc.

In some embodiments, the multi-channel arbitrary waveform generator (AWG) 822 and other suitable microwave pulse signal generators are configured to generate the microwave control pulses that are applied to the qubit drive lines, and the coupler drive lines to control the operation of the superconducting qubits and associated qubit coupler circuitry, when performing various gate operations to execute a given certain quantum information processing algorithm. In some embodiments, the multi-channel AWG 822 comprises a plurality of AWG channels, which control respective superconducting qubits within the superconducting qubit array 832 of the quantum processor 830. In some embodiments, each AWG channel comprises a baseband signal generator, a digital-to-analog converter (DAC) stage, a filter stage, a modulation stage, and an impedance matching network, and a phase-locked loop system to generate local oscillator (LO) signals (e.g., quadrature LO signals LO_I and LO_Q) for the respective modulation stages of the respective AWG channels.

In some embodiments, the multi-channel AWG 822 comprises a quadrature AWG system which is configured to process quadrature signals, wherein a quadrature signal comprises an in-phase (I) signal component, and a quadrature-phase (Q) signal component. In each AWG channel the baseband signal generator is configured to receive baseband data as input (e.g., from the quantum computing platform), and generate digital quadrature signals I and Q which represent the input baseband data. In this process, the baseband data that is input to the baseband signal generator for a given AWG channel is separated into two orthogonal digital components including an in-phase (I) baseband component and a quadrature-phase (Q) baseband component. The baseband signal generator for the given AWG channel will generate the requisite digital quadrature baseband IQ signals which are needed to generate an analog waveform (e.g., sinusoidal voltage waveform) with a target center frequency that is configured to operate or otherwise control a given quantum bit that is coupled to the output of the given AWG channel.

The DAC stage for the given AWG channel is configured to convert a digital baseband signal (e.g., a digital IQ signal output from the baseband signal generator) to an analog baseband signal (e.g., analog baseband signals I(t) and Q(t)) having a baseband frequency. The filter stage for the given AWG channel is configured to the filter the IQ analog signal components output from the DAC stage to thereby generate filtered analog IQ signals. The modulation stage for the given AWG channel is configured to perform analog IQ signal modulation (e.g., single-sideband (SSB) modulation) by mixing the filtered analog signals I(t) and Q(t), which are output from the filter stage, with quadrature LO signals (e.g., an in-phase LO signal (LO_I) and a quadrature-phase LO signal (LO_Q)) to generate and output an analog RF signal (e.g., a single-sideband modulated RF output signal).

In some embodiments, the quantum bit readout control system 824 comprises a microwave pulse signal generator that is configured to applying a microwave tone to a given readout resonator line of a given superconducting qubit to perform a readout operation to readout the state of the given superconducting qubit, as well as circuitry that is configured to process the readout signal generated by the readout resonator line to determine the state of the given superconducting qubit, using techniques known to those of ordinary skill in the art.

The quantum computing platform 810 comprises a software and hardware platform which comprises various software layers that are configured to perform various functions, including, but not limited to, generating and implementing various quantum applications using suitable quantum programming languages, configuring and implementing various quantum gate operations, compiling quantum programs into a quantum assembly language, implementing and utilizing a suitable quantum instruction set architecture (ISA), etc. In addition, the quantum computing platform 810 comprises a hardware architecture of processors, memory, etc., which is configured to control the execution of quantum applications, and interface with the control system 820 to (i) generate digital control signals that are converted to analog microwave control signals by the control system 820, to control operations of the quantum processor 830 when executing a given quantum application, and (ii) to obtain and process digital signals received from the control system 820, which represent the processing results generated by the quantum processor 830 when executing various gate operations for a given quantum application.

Figure 10:
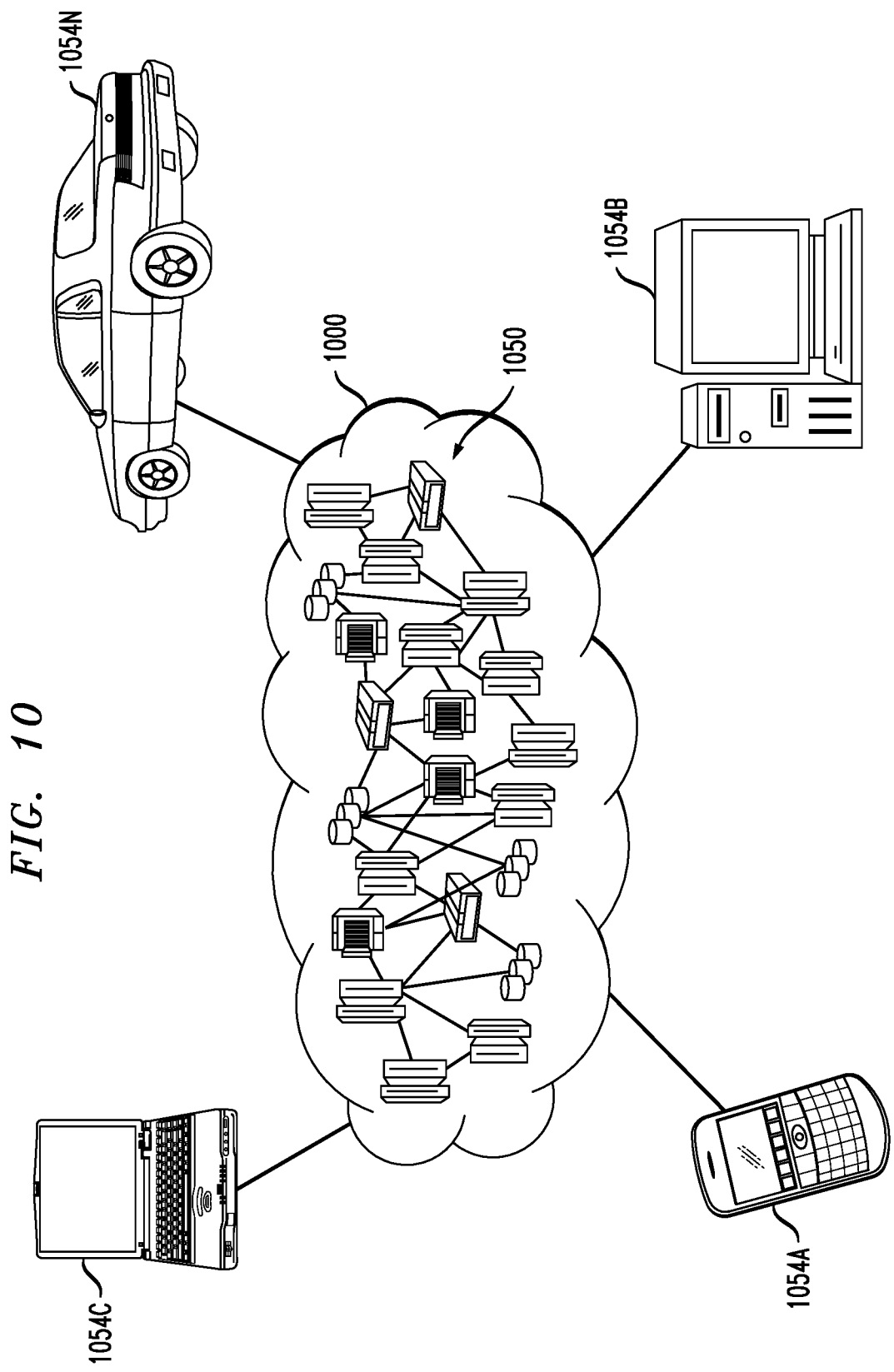
FIG. 10 depicts a cloud computing environment according to an exemplary embodiment of the disclosure.

In some exemplary embodiments, the quantum computing platform 810 of the quantum computing system 800 may be implemented using any suitable computing system architecture (e.g., as shown in FIG. 10) which is configured to implement methods to support quantum computing operations by executing computer readable program instructions that are embodied on a computer program product which includes a computer readable storage medium (or media) having such computer readable program instructions thereon for causing a processor to perform control methods as discussed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations as discussed herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform various operations as discussed herein.

The computer readable program instructions may be provided to a processor of a computer, or other programmable data processing apparatus to produce a machine, such that the instructions, which execute via the processor of the computer or other programmable data processing apparatus, create means for implementing the functions/acts as discussed herein. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement the exemplary computing operations as discussed herein.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts as discussed herein.

The block diagrams in the Figures illustrate the architecture, functionality, and operation of possible implementations of systems, methods, and computer program products according to various embodiments of the present invention. In this regard, each block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and combinations of blocks in the block diagrams, can be implemented by special purpose hardware-based systems that perform the specified functions or acts or carry out combinations of special purpose hardware and computer instructions.

Figure 9:
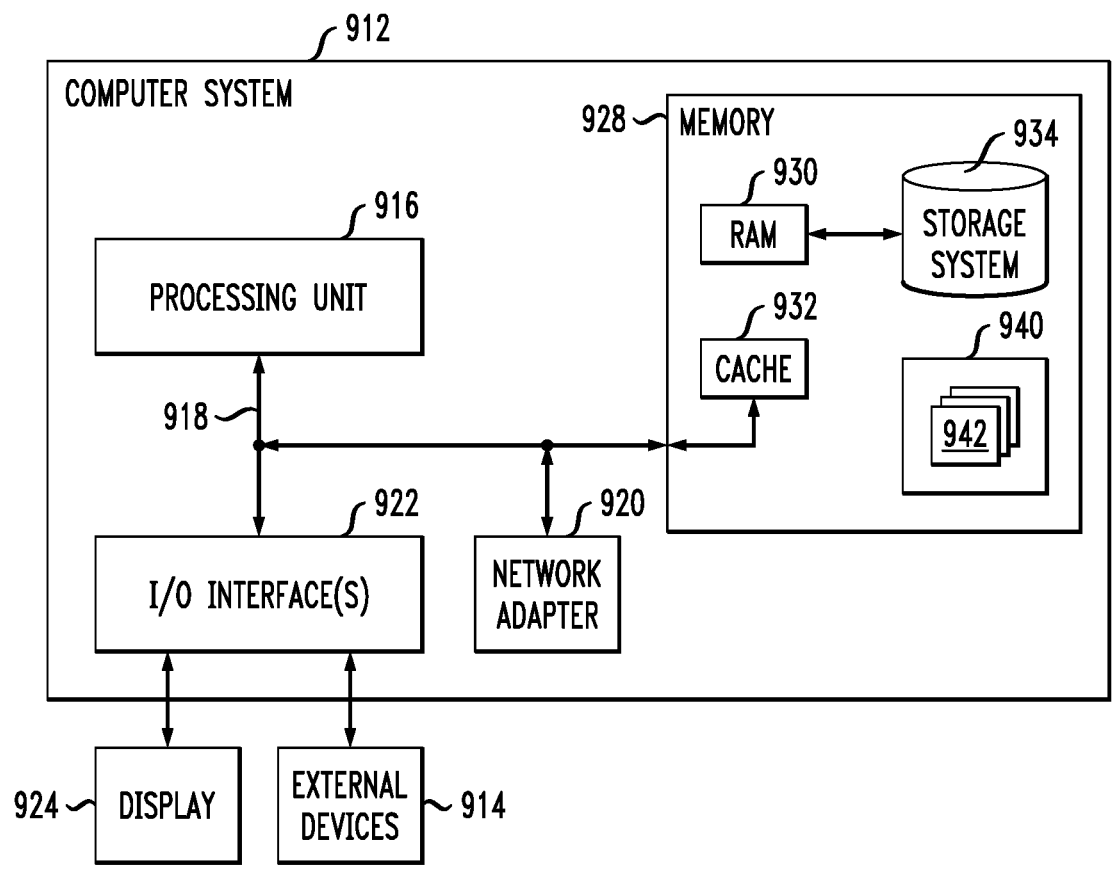
FIG. 9 schematically illustrates an exemplary architecture of a computing node which can host a quantum computing platform, according to an exemplary embodiment of the disclosure.

These concepts are illustrated with reference to FIG. 9 which schematically illustrates an exemplary architecture of a computing node which can host a quantum computing platform, according to an exemplary embodiment of the disclosure. For example, FIG. 9 schematically illustrates an exemplary architecture of a computing node 900 which can host the quantum computing platform 810 (FIG. 8), according to an exemplary embodiment of the disclosure. More specifically, FIG. 9 illustrates a computing node 900 which comprises a computer system/server 912, which is operational with numerous other general purpose or special purpose computing system environments or configurations. Examples of well-known computing systems, environments, and/or configurations that may be suitable for use with computer system/server 912 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 912 may be described in the general context of computer system executable instructions, such as program modules, being executed by a computer system. Generally, program modules may include routines, programs, objects, components, logic, data structures, and so on that perform particular tasks or implement particular abstract data types. Computer system/server 912 may be practiced in distributed cloud computing environments where tasks are performed by remote processing devices that are linked through a communications network. In a distributed cloud computing environment, program modules may be located in both local and remote computer system storage media including memory storage devices.

In FIG. 9, computer system/server 912 in computing node 900 is shown in the form of a general-purpose computing device. The components of computer system/server 912 may include, but are not limited to, one or more processors or processing units 916, a system memory 928, and a bus 918 that couples various system components including system memory 928 to the processors 916.

The bus 918 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 912 typically includes a variety of computer system readable media. Such media may be any available media that is accessible by computer system/server 912, and it includes both volatile and non-volatile media, removable and non-removable media.

The system memory 928 can include computer system readable media in the form of volatile memory, such as random-access memory (RAM) 930 and/or cache memory 932. The computer system/server 912 may further include other removable/non-removable, volatile/nonvolatile computer system storage media. By way of example only, storage system 934 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 918 by one or more data media interfaces. As depicted and described herein, memory 928 may include at least one program product having a set (e.g., at least one) of program modules that are configured to carry out the functions of embodiments of the invention.

The program/utility 940, having a set (at least one) of program modules 942, may be stored in memory 928 by way of example, and not limitation, as well as an operating system, one or more application programs, other program modules, and program data. Each of the operating system, one or more application programs, other program modules, and program data or some combination thereof, may include an implementation of a networking environment. Program modules 942 generally carry out the functions and/or methodologies of embodiments of the disclosure as described herein.

Computer system/server 912 may also communicate with one or more external devices 914 such as a keyboard, a pointing device, a display 924, etc., one or more devices that enable a user to interact with computer system/server 912, and/or any devices (e.g., network card, modem, etc.) that enable computer system/server 912 to communicate with one or more other computing devices. Such communication can occur via Input/Output (I/O) interfaces 922. Still yet, computer system/server 912 can communicate with one or more networks such as a local area network (LAN), a general wide area network (WAN), and/or a public network (e.g., the Internet) via network adapter 920. As depicted, network adapter 920 communicates with the other components of computer system/server 912 via bus 918. It should be understood that although not shown, other hardware and/or software components could be used in conjunction with computer system/server 912. Examples, include, but are not limited to: microcode, device drivers, redundant processing units, external disk drive arrays, RAID systems, SSD drives, and data archival storage systems, etc.

In some embodiments, the quantum computing system 800 of FIG. 8 can be implemented in the cloud (quantum computing as a service (QaaS)) to provide quantum compute facilities as an on-demand service. While this disclosure includes a detailed description on cloud computing, implementation of the teachings recited herein are not limited to a cloud computing environment. Rather, embodiments of the disclosure can be implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10, illustrative cloud computing environment 1000 is depicted. As shown, cloud computing environment 1000 includes one or more cloud computing nodes 1050 with which local computing devices used by cloud consumers, such as, for example, personal digital assistant (PDA) or cellular telephone 1054A, desktop computer 1054B, laptop computer 1054C, and/or automobile computer system 1054N may communicate. Nodes 1050 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1054A-N shown in FIG. 10 are intended to be illustrative only and that computing nodes 1050 and cloud computing environment 1000 can communicate with any type of computerized device over any type of network and/or network addressable connection (e.g., using a web browser).

Figure 11:
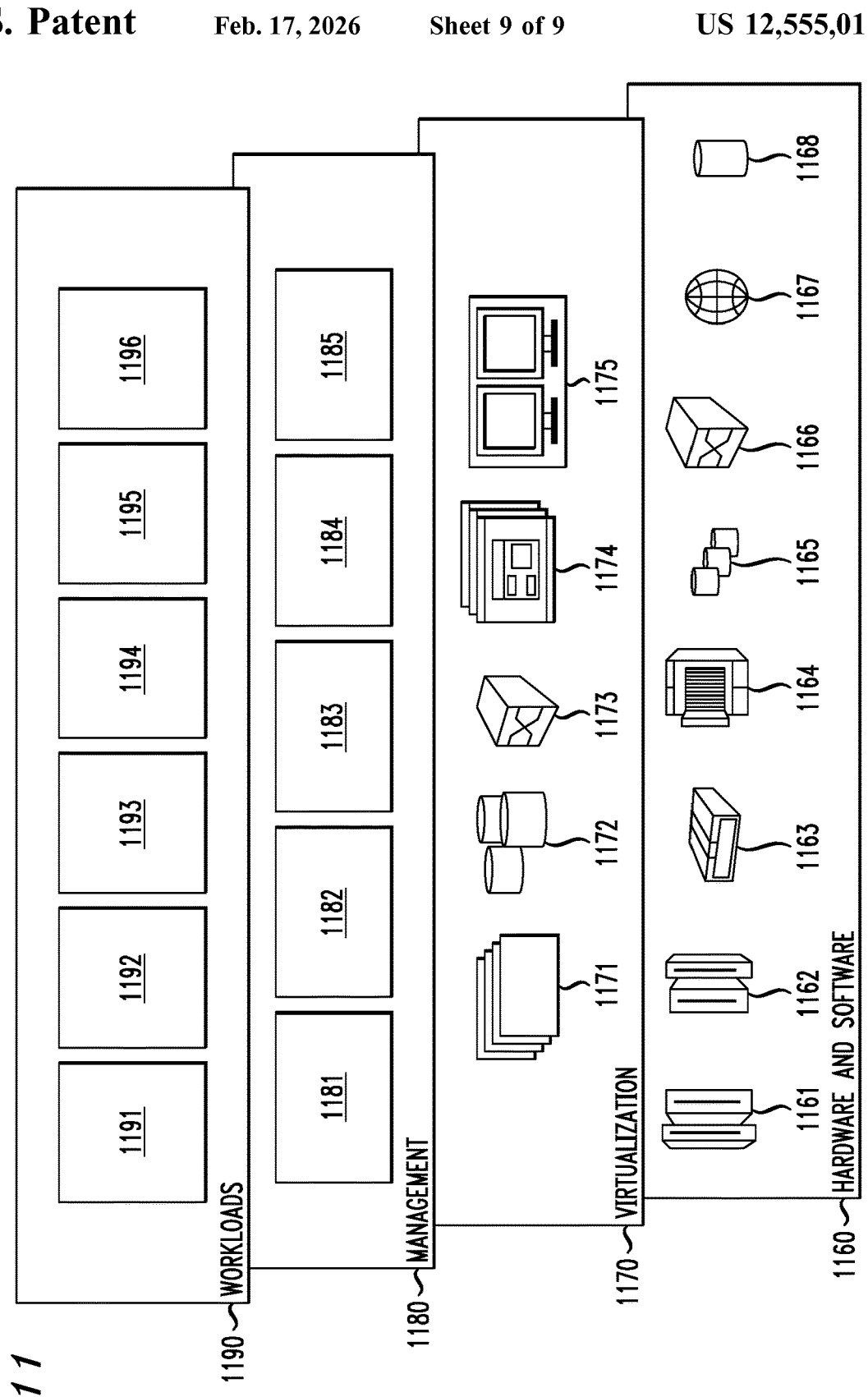
FIG. 11 depicts abstraction model layers according to an exemplary embodiment of the disclosure.

Referring now to FIG. 11, a set of functional abstraction layers provided by cloud computing environment 1000 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 1160 includes hardware and software components. Examples of hardware components include: mainframes 1161; RISC (Reduced Instruction Set Computer) architecture based servers 1162; servers 1163; blade servers 1164; storage devices 1165; and networks and networking components 1166. In some embodiments, software components include network application server software 1167 and database software 1168.

Virtualization layer 1170 provides an abstraction layer from which the following examples of virtual entities may be provided: virtual servers 1171; virtual storage 1172; virtual networks 1173, including virtual private networks; virtual applications and operating systems 1174; and virtual clients 1175.

In one example, management layer 1180 may provide the functions described below. Resource provisioning 1181 provides dynamic procurement of computing resources and other resources that are utilized to perform tasks within the cloud computing environment. Metering and Pricing 1182 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1183 provides access to the cloud computing environment for consumers and system administrators. Service level management 1184 provides cloud computing resource allocation and management such that required service levels are met. Service Level Agreement (SLA) planning and fulfillment 1185 provide pre-arrangement for, and procurement of, cloud computing resources for which a future requirement is anticipated in accordance with an SLA.

Workloads layer 1190 provides examples of functionality for which the cloud computing environment may be utilized. Examples of workloads and functions which may be provided from this layer include: mapping and navigation 1191; software development and lifecycle management 1192; virtual classroom education delivery 1193; data analytics processing 1194; transaction processing 1195; and various functions 1196 for implementing a quantum computing platform of a quantum computing system, such as discussed herein in conjunction with FIG. 9. In some embodiments, the hardware and software layer 1160 would include, e.g., various software and hardware systems of, e.g., the quantum computing system 800 (FIG. 8) as discussed herein, to implement or otherwise support the various workloads and functions 1196 for performing, e.g., quantum computing operations and executing quantum computing applications.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:
a first superconducting quantum bit;
a second superconducting quantum bit; and
a multimode coupler circuit coupled between the first superconducting quantum bit and the second superconducting quantum bit;
wherein the multimode coupler circuit comprises a first mode and a second mode, and is configured to operate in one of a first state and a second state, in response to a flux tuning control signal applied to the multimode coupler circuit;
wherein in the first state of the multimode coupler circuit, the first superconducting quantum bit is exchange coupled to the first mode, and the second superconducting quantum bit is exchange coupled to the second mode, to suppress interaction between the first superconducting quantum bit and the second superconducting quantum bit; and
wherein in the second state of the multimode coupler circuit, the first superconducting quantum bit and the second superconducting quantum bit are exchange coupled to both the first mode and the second mode, to enable interaction between the first superconducting quantum bit and the second superconducting quantum bit and perform an entanglement gate operation.

2. The device of claim 1, wherein the first superconducting quantum bit and the second superconducting quantum bit each comprise a fixed-frequency transmon quantum bit with different transition frequencies.

3. The device of claim 1, wherein the first superconducting quantum bit comprises a superconducting quadrupole transmon quantum bit.

4. The device of claim 1, wherein:
the multimode coupler circuit comprises a first superconducting tunnel junction device, and a second superconducting tunnel junction device, which are coupled to form a superconducting loop; and
the multimode coupler circuit is tuned to operate in one of the first state and the second state, in response to the flux tuning control signal applied to the superconducting loop.

5. The device of claim 1, wherein the multimode coupler circuit comprises a superconducting tunable coupler quantum bit.

6. The device of claim 1, wherein the multimode coupler circuit comprises:
a first superconducting pad;
a second superconducting pad;
a third superconducting pad, disposed between the first superconducting pad and the second superconducting pad;
a superconducting quantum interference device comprising a first superconducting tunnel junction device and second superconducting tunnel junction device, coupled to and between the first superconducting pad and the third superconducting pad and forming a superconducting loop; and
a third superconducting tunnel junction device coupled to and between the second superconducting pad and the third superconducting pad.

7. The device of claim 6, wherein:
the first superconducting quantum bit comprises:
a first node coupled to the first superconducting pad of the multimode coupler circuit; and
a second node coupled to the second superconducting pad of the multimode coupler circuit; and the second superconducting quantum bit comprises a first node coupled to the third superconducting pad of the multimode coupler circuit.

8. The device of claim 6, wherein:
the superconducting quantum interference device comprises a critical current that is tunable in response to the flux tuning control signal applied to the superconducting loop;
the third superconducting tunnel junction device comprises a critical current that is fixed;
the multimode coupler circuit is configured to operate in the first state by applying the flux tuning control signal to the superconducting loop to tune the critical current of the superconducting quantum interference device to be the same or substantially the same as the fixed critical current of the third superconducting tunnel junction device; and
the multimode coupler circuit is configured to operate in the second state by applying the flux tuning control signal to the superconducting loop to tune the critical current of the superconducting quantum interference device to be greater than the fixed critical current of the third superconducting tunnel junction device.

9. A system, comprising;
a quantum processor comprising an array of superconducting quantum bits; and
a control system configured to generate control signals to control the quantum processor;
wherein the array of superconducting quantum bits comprises:
a first superconducting quantum bit;
a second superconducting quantum bit; and
a multimode coupler circuit coupled between the first superconducting quantum bit and the second superconducting quantum bit;
wherein the multimode coupler circuit comprises a first mode and a second mode, and is configured to operate in one of a first state and a second state, in response to a flux tuning control signal applied to the multimode coupler circuit;
wherein in the first state of the multimode coupler circuit, the first superconducting quantum bit is exchange coupled to the first mode, and the second superconducting quantum bit is exchange coupled to the second mode, to suppress interaction between the first superconducting quantum bit and the second superconducting quantum bit; and
wherein in the second state of the multimode coupler circuit, the first superconducting quantum bit and the second superconducting quantum bit are exchange coupled to both the first mode and the second mode, to enable interaction between the first superconducting quantum bit and the second superconducting quantum bit and perform an entanglement gate operation.

10. The system of claim 9, wherein the first superconducting quantum bit and the second superconducting quantum bit each comprise a fixed-frequency transmon quantum bit with different transition frequencies.

11. The system of claim 9, wherein:
the first superconducting quantum bit comprises a superconducting quadrupole transmon quantum bit; and
the array of superconducting quantum bits further comprises:
a second multimode coupler circuit coupled to the superconducting quadrupole transmon quantum bit;
a third multimode coupler circuit coupled to the superconducting quadrupole transmon quantum bit;
a third superconducting quantum bit coupled to the second multimode coupler circuit; and
a fourth superconducting quantum bit coupled to the third multimode coupler circuit.

12. The system of claim 11, wherein the array of superconducting quantum bits comprises a hexagonal lattice structure.

13. The system of claim 9, wherein:
the multimode coupler circuit comprises a first superconducting tunnel junction device, and a second superconducting tunnel junction device, which are coupled to form a superconducting loop; and
the multimode coupler circuit is tuned to operate in one of the first state and the second state, in response to the flux tuning control signal applied to the superconducting loop.

14. The system of claim 9, wherein:
the multimode coupler circuit comprises:
a first superconducting pad;
a second superconducting pad;
a third superconducting pad, disposed between the first superconducting pad and the second superconducting pad;
a superconducting quantum interference device comprising a first superconducting tunnel junction device and second superconducting tunnel junction device, coupled to and between the first superconducting pad and the third superconducting pad and forming a superconducting loop;
a third superconducting tunnel junction device coupled to and between the second superconducting pad and the third superconducting pad;
the first superconducting quantum bit comprises:
a first node coupled to the first superconducting pad of the multimode coupler circuit; and
a second node coupled to the second superconducting pad of the multimode coupler circuit; and
the second superconducting quantum bit comprises a first node coupled to the third superconducting pad of the multimode coupler circuit.

15. The system of claim 14, wherein:
the superconducting quantum interference device comprises a critical current that is tunable in response to the flux tuning control signal applied to the superconducting loop;
the third superconducting tunnel junction device comprises a critical current that is fixed;
the multimode coupler circuit is configured to operate in the first state by applying the flux tuning control signal to the superconducting loop to tune the critical current of the superconducting quantum interference device to be the same or substantially the same as the fixed critical current of the third superconducting tunnel junction device; and
the multimode coupler circuit is configured to operate in the second state by applying the flux tuning control signal to the superconducting loop to tune the critical current of the superconducting quantum interference device to be greater than the fixed critical current of the third superconducting tunnel junction device.

16. A device, comprising:
a first superconducting transmon quantum bit;
a second superconducting transmon quantum bit; and
a superconducting multimode coupler circuit coupled between the first superconducting transmon quantum bit and the second superconducting transmon quantum bit, wherein the superconducting multimode coupler circuit comprises:
- a first superconducting pad;
- a second superconducting pad;
- a third superconducting pad, disposed between the first superconducting pad and the second superconducting pad;
- a superconducting quantum interference device comprising a first superconducting tunnel junction device and a second superconducting tunnel junction device, coupled to and between the first superconducting pad and the third superconducting pad and forming a superconducting loop; and
- a third superconducting tunnel junction device coupled to and between the second superconducting pad and the third superconducting pad;

wherein the first superconducting transmon quantum bit is coupled to the first superconducting pad and to the second superconducting pad of the superconducting multimode coupler circuit; and wherein the second superconducting transmon quantum bit is coupled to the third superconducting pad of the superconducting multimode coupler circuit.

17. The device of claim 16, wherein:

the superconducting multimode coupler circuit comprises a first mode, and a second mode, and is configured to operate in one of a first state and a second state, in response to a flux tuning control signal applied to the superconducting quantum interference device;

in the first state of the multimode coupler circuit, the first superconducting transmon quantum bit is exchange coupled to the first mode, and the second superconducting transmon quantum bit is exchange coupled to the second mode, to suppress interaction between the first superconducting transmon quantum bit and the second superconducting transmon quantum bit; and in the second state of the multimode coupler circuit, the first superconducting transmon quantum bit and the second superconducting transmon quantum bit are exchanged coupled to both the first mode and the second mode, to enable an interaction between the first superconducting transmon quantum bit and the second superconducting transmon quantum bit and perform an entanglement gate operation.

18. The device of claim 16, wherein the first superconducting transmon quantum bit and the second superconducting transmon quantum bit each comprise a fixed-frequency transmon quantum bit with different transition frequencies.

19. The device of claim 16, wherein:

the first superconducting transmon quantum bit comprises:
- a first superconducting pad;
- a second superconducting pad which is coupled to the first superconducting pad;
- a third superconducting pad;
- a fourth superconducting pad coupled to the third superconducting pad; and a superconducting tunnel junction device coupled to the first superconducting pad, the second superconducting pad, the third superconducting pad, and the fourth superconducting pad.

20. The device of claim 19, further comprising:

a second superconducting multimode coupler circuit coupled to the first superconducting transmon quantum bit; and a third superconducting multimode coupler circuit coupled to the first superconducting transmon quantum bit.

* * * * *